US011549605B2

(12) United States Patent
Vandrak et al.

(10) Patent No.: US 11,549,605 B2
(45) Date of Patent: Jan. 10, 2023

(54) TEMPERATURE SENSITIVE VALVE

(71) Applicant: Enerco Group, Inc., Cleveland, OH (US)

(72) Inventors: Brian S Vandrak, Highland Heights, OH (US); Zheng-hui Mai, Guangdong (CN); Guo-quan Chen, Guangdong (CN); You-zhi Gu, Guangdong (CN); Jin-tang You, Guangdong (CN)

(73) Assignee: Enerco Group, Inc., Cleveland, OH (US)

( * ) Notice: Subject to any disclaimer, the term of this patent is extended or adjusted under 35 U.S.C. 154(b) by 0 days.

(21) Appl. No.: 17/586,059

(22) Filed: Jan. 27, 2022

(65) Prior Publication Data

US 2022/0146008 A1    May 12, 2022

Related U.S. Application Data

(63) Continuation of application No. 16/731,297, filed on Dec. 31, 2019, now Pat. No. 11,261,981, which is a
(Continued)

(30) Foreign Application Priority Data

Oct. 18, 2016    (CN) .......................... 201610905941.9

(51) Int. Cl.
*F16K 17/38*    (2006.01)
*F16K 17/00*    (2006.01)
(Continued)

(52) U.S. Cl.
CPC ....... *F16K 17/003* (2013.01); *F02M 63/0205* (2013.01); *F16K 1/12* (2013.01);
(Continued)

(58) Field of Classification Search
CPC .. F02M 63/0205; F02M 2200/18; F16K 1/12; F16K 17/383; F16K 17/40; F16K 31/1221; F16K 17/003
See application file for complete search history.

(56) References Cited

U.S. PATENT DOCUMENTS 5,027,845 A    7/1991    Silagy
7,246,607 B2    7/2007    Burke et al.
(Continued)

FOREIGN PATENT DOCUMENTS

CN    106337956 A    1/2017

OTHER PUBLICATIONS

PCT International Search Report and Written Opinion from the International Application, PCT/US2017/056932, dated Jan. 17, 2018, pp. 1-17.
(Continued)

*Primary Examiner* — P. Macade Nichols
(74) *Attorney, Agent, or Firm* — Tucker Ellis LLP; Michael G. Craig; Heather M. Barnes

(57) ABSTRACT

One or more techniques and/or systems are disclosed for interrupting fluid flow when experiencing fuel leaking conditions, such as an out of specification connection between the fuel source and a device utilizing the fluid. A distal end of a valve body has interfaces with at least a portion of a connection to a fluid supply; and a proximal end interfaces with at least a portion of a fuel intake. An internal passage runs between the proximal end and distal ends of. A displacement member in the internal passage comprises a distal portion that extends out of the valve to engage a valve to the fuel supply. A retention cap selectably engaged with the valve body can comprise a material that deforms under force at a predetermined temperature, resulting in a release of the
(Continued)

displacement member under a biasing force form a biasing component between the cap and displacement member.

20 Claims, 18 Drawing Sheets

Related U.S. Application Data continuation of application No. 15/785,944, filed on Oct. 17, 2017, now Pat. No. 10,544,871.

(60) Provisional application No. 62/491,570, filed on Apr. 28, 2017.

(51) Int. Cl.
| | |
|---|---|
| *F02M 63/02* | (2006.01) |
| *F16K 1/12* | (2006.01) |
| *F16K 17/40* | (2006.01) |
| *F16K 31/122* | (2006.01) |

(52) U.S. Cl.
CPC ............ *F16K 17/383* (2013.01); *F16K 17/40* (2013.01); *F16K 31/1221* (2013.01); *F02M 2200/18* (2013.01)

(56) References Cited

U.S. PATENT DOCUMENTS

| | | |
|---|---|---|
| 7,387,134 B2 | 6/2008 | Moore et al. |
| 2005/0067025 A1 | 3/2005 | Ricco et al. |
| 2011/0293045 A1 | 12/2011 | Vandrak |
| 2015/0159764 A1* | 6/2015 | Peli ................ F16K 17/383 137/72 |
| 2018/0106389 A1 | 4/2018 | Vandrak et al. |

OTHER PUBLICATIONS

PCT International Preliminary Report on Patentability from the International Application, PCT/US2017/056932, dated Apr. 23, 2019, pp. 1-11.

* cited by examiner

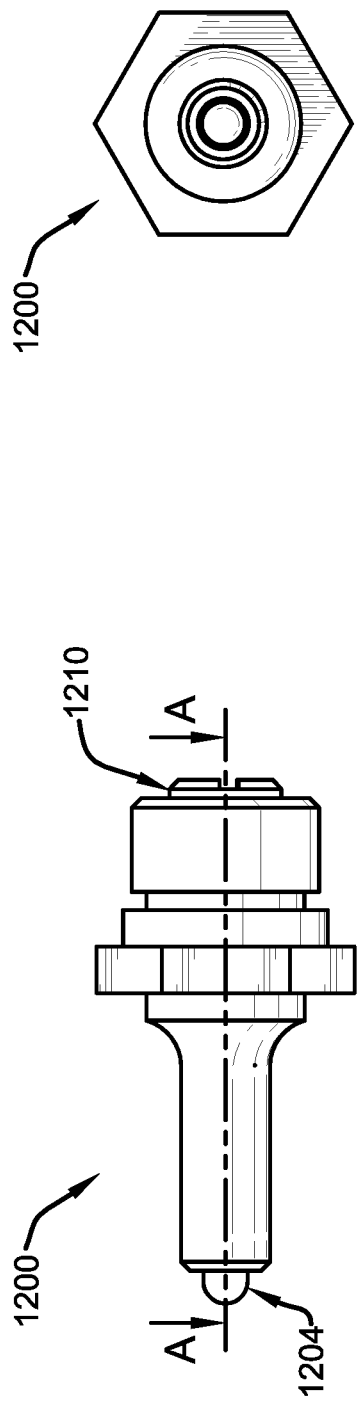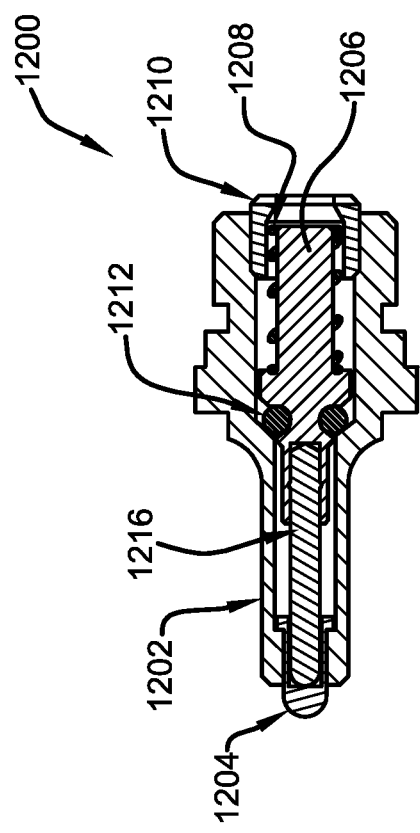
FIGURE 13A
FIGURE 13B
FIGURE 13C

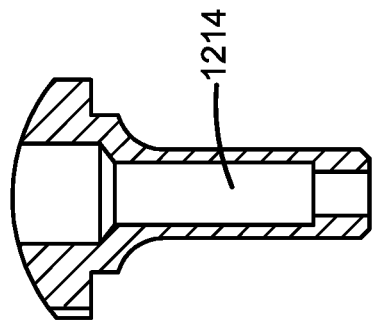
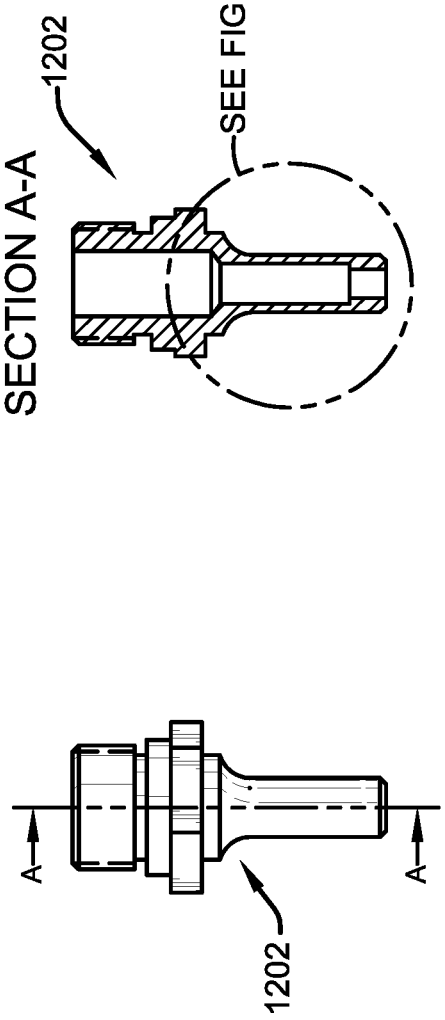
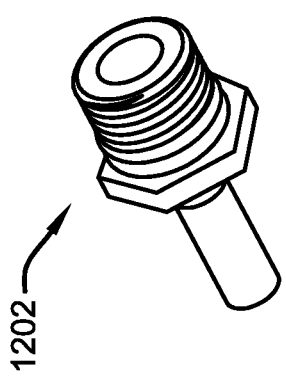
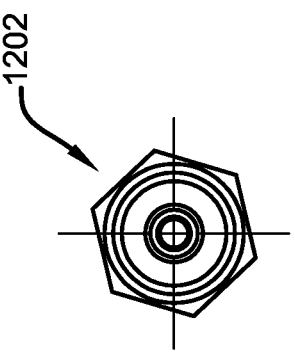
FIGURE 14E
FIGURE 14B
FIGURE 14D
FIGURE 14A
FIGURE 14C

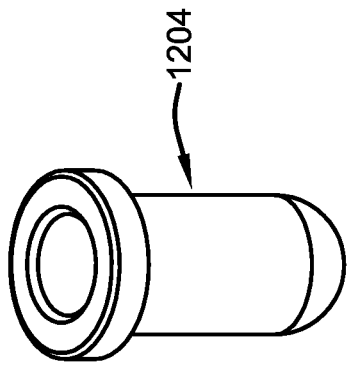
FIGURE 17B
FIGURE 17C
FIGURE 17A

SECTION A-A

TEMPERATURE SENSITIVE VALVE

CROSS-REFERENCE TO RELATED APPLICATIONS

This application is a continuation application of U.S. Ser. No. 16/731,297, entitled TEMPERATURE SENSITIVE VALVE, filed Dec. 31, 2019, which is a continuation application of U.S. Ser. No. 15/785,944, now U.S. Pat. No. 10,544,871, entitled TEMPERATURE SENSITIVE VALVE, filed Oct. 17, 2017, which claims priority to U.S. Provisional Patent Application Ser. No. 62/491,570, entitled TEMPERATURE SENSITIVE VALVE, filed Apr. 28, 2017; and claims priority to China Patent Application No. CN 201610905941.9, entitled A TEMPERATURE-SENSING FUSE THIMBLE VALVE, filed Oct. 18, 2016; all of which are incorporated herein by reference.

BACKGROUND

Devices and systems having a combustion operation will utilize some sort of combustible fuel, often in the form of liquid, pressurized gas, or pressurized liquid (e.g., or more than one). In some devices and systems, the fuel can be provided through a connection to a fuel source, such as a larger remote source, or a local fuel storage container. For safety purposes, at the point of connection between the device or system and the fuel source, one or more safety valves may be utilized, for example, that allow for fuel flow in the presence of a usable connection. Occasionally, a usable connection is made, but the connection may not be completely sealed (e.g., due to cross-threading of connections). As an example, a poorly sealed connection may lead to leakage of the fuel.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more systems and methods that maybe used to provide for an interruption of fuel supply (e.g., in the form of a fluid), such as a liquid or gas fuel supply, when experiencing an condition outside of intended use parameters, such as a poor connection between the fuel source and the device or system utilizing the fuel. For example, such a system may be used to interrupt the flow of a fluid to a combustion device when the system is exposed to elevated temperatures, which may be indicative of the condition outside of intended use parameters.

In one implementation, a system for mitigating fluid flow at a predetermined temperature can comprise a valve body with a distal end that interfaces with at least a portion of a connection to a fluid supply (e.g., a gas or liquid fuel supply). In this implementation, the valve body can comprise a proximal end that has an intake interface portion that may interface with at least a portion of a fluid intake of a target device. Further, the valve body can comprise an internal passage that runs between the proximal end and distal end of the valve body. In this implementation, a displacement member can be disposed in the internal passage, and may comprise a distal portion that extends out of the valve body at the distal end to engage a valve to the fluid supply. The displacement member can also comprise a proximal stop that is disposed toward the proximal end of the displacement member.

Additionally, in this implementation, the system can comprise a retention cap that may be selectably engaged with the valve body at the distal end. The retention cap can comprise a material that deforms under force at a predetermined temperature, which can result in a release of the displacement member from a preset position in the valve body. The system can also comprise a biasing component that is disposed in the internal passage. The biasing component can apply a biasing force to the proximal stop of the displacement member at the biasing component's distal end, and apply a biasing force to the retention cap at the biasing component's proximal end.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 13A, 13B and 13C are a component diagrams illustrating one or more portions of one or more systems described herein.

FIGS. 14A, 14B, 14C, 14D and 14E are a component diagrams illustrating one or more portions of one or more systems described herein.

FIGS. 17A, 17B and 17C are a component diagrams illustrating one or more portions of one or more systems described herein.

DETAILED DESCRIPTION

Figure 1:
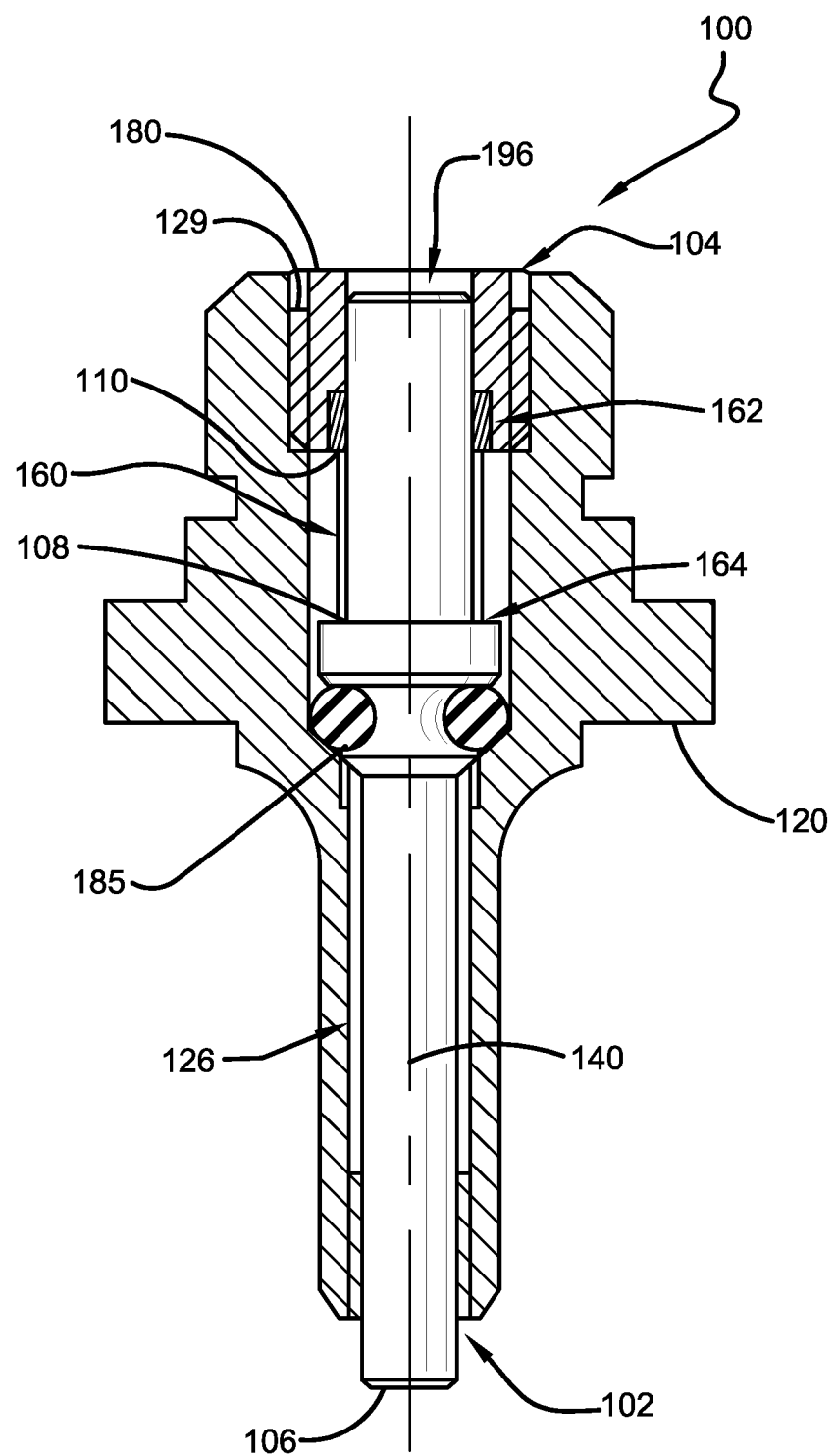
FIG. 1 is a sectional view of one implementation of a temperature-sensitive fluid flow interruption device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

A device and system may be devised that can be used to interrupt flow of fluid from a fluid source (e.g., fuel source) to a target device (e.g., a device using combustion of fuel). In one implementation, a type of sacrificial component can be disposed at one end of a fluid intake valve, where the sacrificial component is configured to deform when exposed to predetermined, elevated temperatures. That is, for example, the sacrificial component can comprise a material that is configured to deform at a predetermined temperature, and the deformation can result in a change in the function of the intake. In this example, the deformation of the sacrificial component at the one end can result in displacement of another valve component that prevents it from functioning to allow fluid flow. Further, for example, only replacement of the sacrificial component with a replacement part would allow the intake valve to return to appropriate functioning condition.

FIG. 1 is a component diagram illustrating an example implementation of a system and device 100 for mitigating flow of fluid under undesirable conditions. The example device 100 comprises a valve body 120. The valve body 120 can comprise a distal end 102 and a proximal end 104. The distal end 102 can be configured to interface with at least a portion of a connection to a fluid supply, such a fluid storage container and/or other fluid source (e.g., pressurized) For example, the fluid source can be a fuel supply that comprises a pressurized fuel in liquid form (e.g., or a non-pressurized liquid fuel). Further, as an example, the fluid flow may comprise a flow of liquid fuel or a flow of fuel in gas form (e.g., when pressurized liquid fuel transforms to a gas form for use in combustion). The proximal end 104 can comprise an intake interface portion that is configured to interface with at least a portion of a fluid intake, such as a fluid intake of a target device (e.g., a heater or some other device or system that uses combustion of fuel). Further, the valve body 120 can comprise an internal passage 126 that runs between the proximal end 104 and distal end 102 of the valve body 120.

In FIG. 1, in this example implementation, a displacement member 140 can be disposed in the internal passage 126. The displacement member 140 can comprise a distal portion 106 that extends out of the valve body 120 at the distal end 102. In one implementation, as shown below, the distal portion 106 can be configured to engage a valve to the fuel supply. Further, the displacement member 140 can comprise a proximal stop 164 that is disposed toward the proximal end 104 of the displacement member 140.

In this implementation, the example device 100 can comprise a retention cap 180. The retention cap 180 can be selectably engaged with the valve body 120 at the proximal end 104. Further, the retention cap 180 can comprise a material that deforms under force, at a predetermined temperature. In one implementation, the deformation can result in a release of the displacement member 140 from a preset position in the valve body 120. Additionally, the example device 100 can comprise a biasing component 160 that is disposed in the internal passage 126. In this example, the biasing component 160 can apply a biasing force to the proximal stop 164 of the displacement member 140 at the biasing component's distal end 108. The biasing component 160 can also apply a biasing force to the retention cap 180 at the biasing component's proximal end 110, such as at a biasing stop 162 on the cap 180.

As an illustrative example, the example device 100 of FIG. 1 can be coupled to a fuel source connection that comprises a Schrader-type valve in engagement with the distal portion 106 of the displacement member 140. In this example, the Schrader-type valve can apply a force toward the proximal end 104 of the valve body 120. However, the biasing force of the biasing component 160 against the proximal stop 164 of the displacement member 140 can be configured to overcome (e.g., is greater than) the force of the Schrader-type valve, thereby allowing the Schrader-type valve to open.

Further, as one example, the example device 100 may be subjected to elevated temperatures that reach the predetermined temperature level. In this example, the predetermined temperature level may be set to be indicative of a condition outside of specified use, such as high temperatures resulting from unspecified combustion (e.g., due to fuel leakage and combustion). The retention cap 180 can be subjected to the biasing force from the biasing component 160, at least at the proximal end of the retention cap 180. Additionally, in this example, at the predetermined temperature, the material comprised in the retention cap 180 may begin to deform under the biasing force. That is, for example, as the material deforms (e.g., becomes pliable and loses rigidity), at least a portion of the retention cap 180 can deform, and the proximal end 110 of the biasing component may move away from the proximal stop 164 of the displacement member 140. In this example, as the proximal end 110 of the biasing component moves away from the proximal stop 164 of the displacement member 140, the amount of biasing force applied to the proximal stop 164 is reduced. As the biasing force applied to the proximal stop 164 is reduced below the force (e.g., less than) of the Schrader-type valve, the displacement member may be forced toward the proximal end 104 of the valve body 120. In this way, in this example, the displacement member 140 has been released from its preset position (e.g., preset when coupled with the Schrader-type valve) in the valve body 120.

Figure 6:
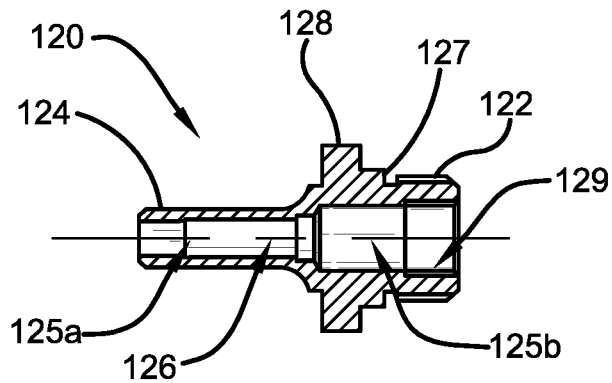
FIG. 6 is a component diagram illustrating one or more portions of one or more systems described herein.

FIGS. 2A, 3, 9 and 10 are component diagrams illustrating one example implementation of a device for mitigating fuel flow at a predetermined temperature. With continued reference to FIG. 1, in one aspect, a device (e.g., retention cap 180) may be used with a fluid flow valve to mitigate fuel flow in conditions operated outside of specified use. In one implementation, such a device can comprise a valve engagement component 182. The valve engagement component 182 can be configured to fixedly engage with a proximal end 218 of a pressurized fluid intake valve 200. In one implementation, as illustrated in FIGS. 1 and 6, the valve engagement component 182 can be configured to engage with a retention cap engagement component 129 disposed on the interior surface of the proximal end 104 of the valve 100. As one example, the valve engagement component 182 may comprise a set of screw threads that are configured to couple with complementary threads in the retention cap engagement component 129. In this way, in this example, the device (e.g., retention cap 180) can be selectably threaded into and out of the valve body 120, at its proximal end 104. Other examples of a valve engagement component 182 can include a press fit engagement with the valve body 102, quick connect couplings, universal couplings, quick lock, twist lock, or any other suitable fitting/coupling selected using sound engineering judgement for the application.

In this implementation, in this aspect, the example device can comprise a biasing stop 162 that can be configured to provide a proximal stop for the biasing component (e.g., biasing component 160) that is disposed in the intake valve 100. In one implementation, the device may comprise an alternate biasing stop, such as a cap shoulder stop 184 that is recessed into an internal cavity 188 in the device. That is, for example, the biasing stop 162 can be configured to engage with the proximal end 110 of the biasing component, such that a biasing force is applied to the example device (e.g., retention cap 180) at the location of the biasing stop 162 (e.g., or cap shoulder stop 184 alternatively).

In this implementation, the example device may further comprise an internal cavity 188 that comprises an opening 194 at its distal end 192. The internal cavity 188 can be so dimensioned to receive a proximal end 196 of a displacement member 140 in the intake valve 100. That is, for example, the internal cavity 188 can be of a size and shape that allows the displacement member 140 to be translated (e.g., slid laterally) inside the cavity 188. As an example, when the intake valve 100 is assembled, the displacement member 140 may be inserted into the internal cavity 126 prior to engaging the retention cap 180 with the valve, in this example, the cavity 188 can allow the proximal end 196 of the displacement member 140 to slide into the retention cap 180 when assembled.

In this implementation, the example device can additionally comprise a wall 198 that defines at least a portion of the cavity 188. In one implementation, at least a portion of the wall 198, the valve engagement component 182, and/or the biasing stop 162 can be comprised of a material that deforms at a predetermined temperature. In this implementation, the deformation of the material can result in a release of the biasing component 160 from a preset position in the intake valve. As described above, for example, when the material is subjected to elevated temperatures it can deform (e.g., become pliable). In this example, the deformation of the material may allow the proximal end 110 of the biasing component 160 to move from the preset position by pushing at least a portion of the device (e.g., retention cap 180) toward the proximal end of the valve 104.

A method may be devised for making a fuel intake valve. For example, the fuel intake valve may be made to provide for interruption of fuel flow from a fuel source, such as to a device that uses the fuel for combustion (e.g., heater, stove, etc.). In one implementation of an exemplary method, the method for making a fuel intake valve can comprise disposing a displacement member (e.g., 140) in an internal passage (e.g., 126) of a valve body (e.g., 120). In this implementation, the displacement member can comprise a distal portion (e.g., 106) that extends out of the valve body at the distal end (e.g., 102) to engage a valve to the fuel supply. Further, the displacement member can comprise a proximal stop (e.g., 164) that is disposed toward the proximal end (e.g., 196) of the displacement member.

Additionally, in this implementation of an exemplary method, the distal end of the valve body can be configured to interface with at least a portion of a connection to the fuel supply. In this implementation, the valve body can also comprise a proximal end (e.g., 104) that comprises an intake interface portion (e.g., 122). The intake interface portion can be configured to interface with at least a portion of a fuel intake, such as an intake for a target device. That is, for example, the intake interface portion may be configured to threadedly engage with a portion of a regulator of the target device. In this implementation, the internal passage of the valve body can comprise a passage that runs between the proximal end and distal end of the valve body. It should be noted, that while a portion of the interface of the fluid or fuel intake can comprise a regulator, in alternate implementations it may comprise a connection to the target device, and/or a connection with a remote hose that leads to the target device, or other interfaces between a fuel supply and a target device.

In the exemplary method, a retention cap (e.g., 180) can be engaged with the valve body at the valve body's distal end. In this implementation, the retention cap can comprise a material that deforms under force at a predetermined temperature. For example, the retention cap 180 can comprise a polymer, eutectic alloy, polypropylene (PP), or a linear low density polyethylene (LLDPE), other type of plastics, and/or combinations of various polymers (e.g., 40% LLDPE and 60% PP). Further, the deformation can result in a release of the displacement member from a preset position in the valve body. Additionally, in the method, a biasing component (e.g., 160) can be disposed in the internal passage, such that the biasing component applies a biasing force to the proximal stop of the displacement member at the biasing component's distal end (e.g., 108); and the biasing component can apply a biasing force to the retention cap at the biasing component's proximal end (e.g., 110). In this way, a biasing force can be applied to the retention cap, which allows for the release of the displacement member when the material deforms.

Figure 2B:
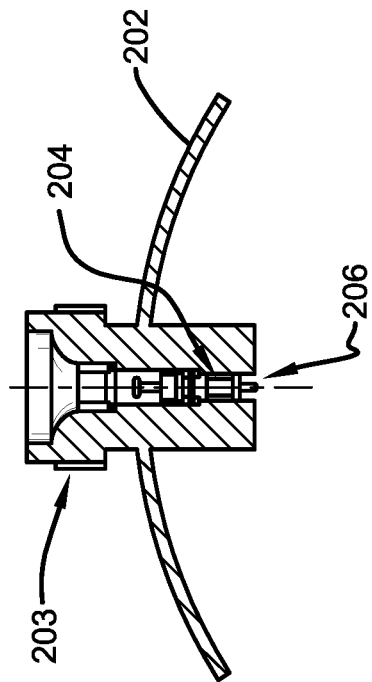
FIGS. 2A and 2B are a sectional view of example implementations of one or more portions of one or more systems described herein.
Figure 2A:
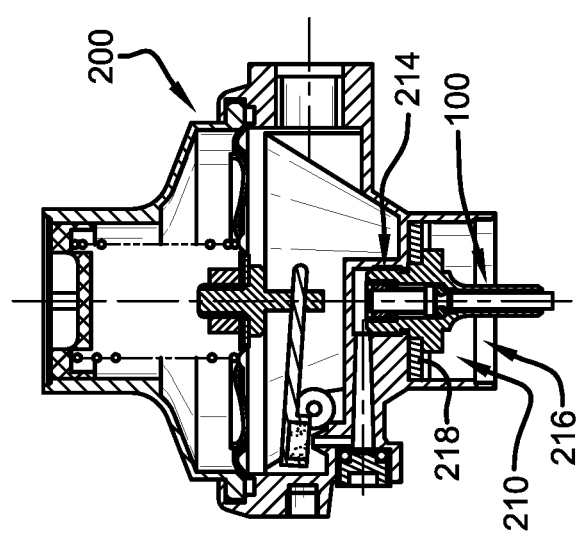
Figure 4:
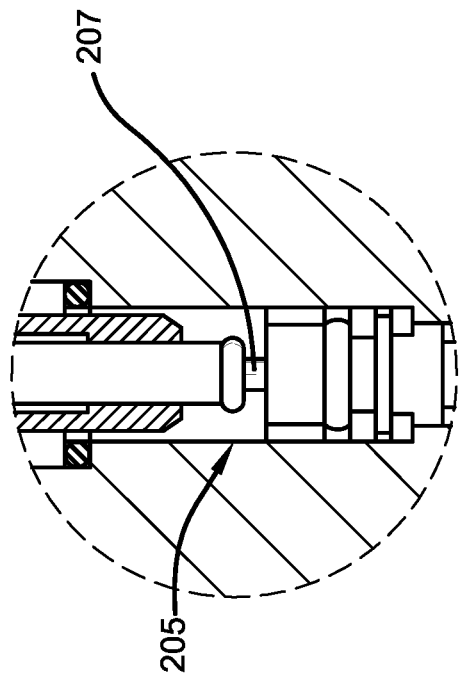
FIG. 4 is a detail view of the sectional view of one or more portions of one or more systems described herein.
Figure 3:
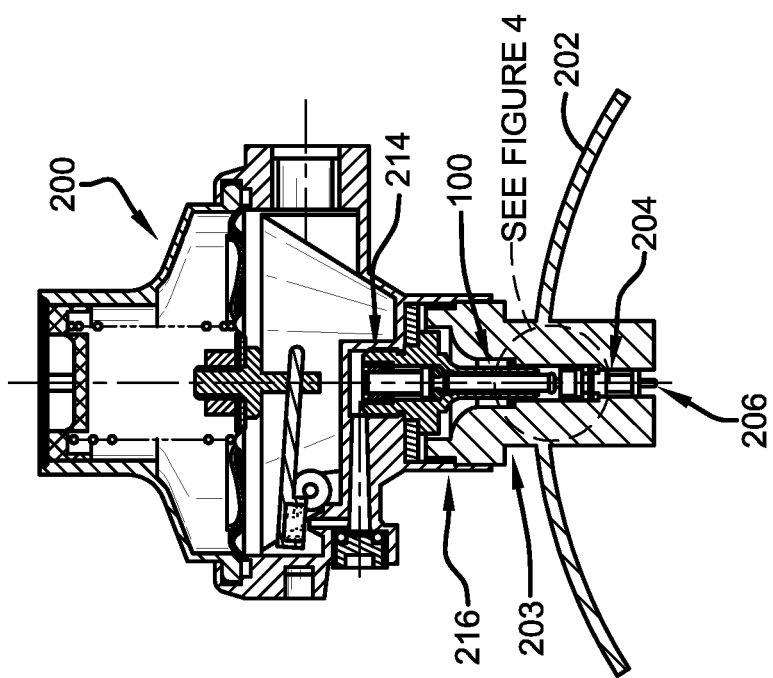
FIG. 3 is a sectional view of one implementation of a temperature-sensitive fluid flow interruption device.
Figure 5:
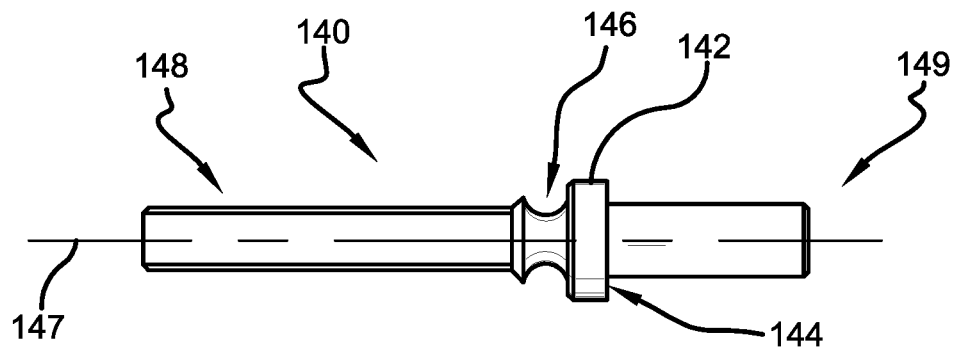
FIG. 5 is a component diagram illustrating one or more portions of one or more systems described herein.

As an illustrative example, with reference to FIGS. 2-4 and continued reference to FIGS. 11, 6, 9 and 10, FIGS. 2-4 are component diagrams illustrating an implementation of a pressure regulator 200 comprising a temperature-sensitive fluid flow interruption device 100. In this example implementation, the pressure regulator 200 may comprise an inlet port 210 adapted for fluid communication with a fluid supply 202 (e.g., pressurized fuel container). A fluid supply, may be referred to herein as a "bottle," and may comprise a bottle, tank, reservoir, or other container adapted for holding gaseous or fluid material; and may also include remote fuel sources, such as connections to utility (or other remote) sources of fuel. Without limitation, fluid supply 202 may be a bottle for, or a bottle adapted to contain, or a bottle containing, propane, propene, MAPP gas, methylacetylene-propadiene, oxygen, nitrous oxide, natural gas, methane, ethane, butane, liquid petroleum gas, hydrogen, HCNG, helium, neon, argon, nitrogen, carbon dioxide, any other gas, or mixtures thereof. In certain implementations a pressure regulator 200 may comprise an opening 214 adapted for a fluid communicative connection with a temperature-sensitive fluid flow interruption device 100. The pressure regulator 200 may comprise an opening 216 adapted for a fluid communicative connection with a fluid supply 202. Openings 214 and 216, disposed at the proximal end 218 of the pressurized fluid intake valve 200 (e.g., regulator) may be substantially fixed in relationship to one another such that a temperature-sensitive fluid flow interruption device 100 and a fluid supply 202 connected thereto may be positively located with respect to one another. In certain implementations, and without limitation, openings 214 or 216 may comprise female threads, male threads, clamping regions, or other fluid communicative connection elements. In the implementation shown in FIGS. 2-3, the temperature-sensitive fluid flow interruption device 100 is connectable to opening 214 to form a fluid communicative connection therebetween.

In the implementations shown in FIG. 2-4, the fluid supply 202 may comprise a connector 203 adapted for fluid communicative connection to the opening 216 of the pressure regulator 200. In certain implementations, and without limitation, connector 203 may comprise complementary threads, clamping regions, or other fluid communicative connection elements. In the implementation shown in FIG. 3, the connector 203 may comprise threads and is threaded into complementary threads in the threaded opening 216 to form a fluid communicative connection therebetween. Connector 203 can also include a Schrader-type valve 204 (e.g., or poppet valve) located within a channel 205 in the connector 203. A Schrader-type valve 204 can comprise a valve consisting of an opening (not shown), a plug 206, and, optionally, a valve stem shaft 207 operatively engaged with said plug 206. Schrader-type valves 204 can be normally-open or normally-closed valves. In certain implementations, and without limitation, the Schrader-type valve 204 may comprise a Schrader valve or other kind of Schrader-type valve. A Schrader valve is a normally-closed Schrader-type valve wherein the plug 206 is connected to a valve stem 207 and wherein the plug 206 is held in a normally-closed position by a biasing component (not shown) that is adapted to exert a closure force on the plug 206. As used herein, unless otherwise noted, a Schrader-type valve 204 is a Schrader valve. A Schrader-type valve 204 can be opened by application of a force greater than the Schrader-type valve closure force to the plug 206 to move the plug 206 out of its closed position and, thereby, to open the valve to permit fluid flow. In certain implementations, the force to open the Schrader-type valve 204 is applied to the valve stem 207 and, thereby, to the plug 206.

The temperature-sensitive fluid flow interruption device 100 may comprise a valve body 120, a displacement member 140, a biasing component 160 (e.g., spring), and a retention cap 180. Some implementations of the temperature-sensitive fluid flow interruption device 100 comprise optional components such as a gasket 185 (e.g., O-ring) or other components. The temperature-sensitive fluid flow interruption device 100 is adapted for compatibility with fluid flow during operation in one temperature region and is adapted to interrupt fluid flow during operation in a second temperature region. Without limitation, adaptations to interrupt fluid flow during operation in a second temperature region may comprise movement, displacement, deformation, breakage, fracture, bending, melting, or other changes in a part, component, or sub-assembly of the temperature-sensitive fluid flow interruption device 100.

In some implementations, without limitation, adaptations to interrupt fluid flow during operation in a second temperature region comprise movement or displacement of one or more components of the temperature-sensitive fluid flow interruption device 100 away from a position necessary to maintain fluid flow. In some implementations, during operation in a first temperature region, a component of the temperature-sensitive fluid flow interruption device 100 forms an interference with a Schrader-type valve 204 displacing the Schrader-type plug 206 to open the valve against the valve's biasing component, while during operation in a second temperature region the valve's biasing component displaces the component of the temperature-sensitive fluid flow interruption device 100 permitting the Schrader-type plug 206 to close the valve. In some implementations, without limitation, the temperature-sensitive fluid flow interruption device 100 is adapted for re-use after functioning to interrupt of fluid flow through adaptations to interrupt fluid flow during operation in a second temperature region comprising only changes in the position of components with respect to one another, such that resetting the temperature-sensitive fluid flow interruption device 100 to a position compatible with fluid flow is only a matter of moving the original components back to their original state.

In some implementations, the valve body 120 may comprise a polygon shape or any shape chosen with sound engineering judgment. Without limitation, the shape of the valve body may be polygonal or irregular in shape. As used herein, polygonal may comprise both 1) a polyhedron with two polygonal faces lying in parallel planes and with the other faces parallelograms and 2) a cylinder. In general, the surfaces of a cylinder are the end surfaces and the curved surface between the end surfaces; the curved surface between the end surfaces will be referred to as the lateral surface. The valve body 120 may comprise an intake interface component 122 adapted for connection with a fluid intake of a target device, such as a pressure regulator 200 for a fuel combusting device. In certain implementations, the valve body 120 may comprise an elongated portion 124 at the distal portion 106 of the valve body 120. Further, the valve body 120 can comprise an internal passage 126 disposed inside the valve body 120, and running from the proximal 104 to the distal ends 102. The internal passage 126 may comprise a distal cavity 125a, disposed in the elongated portion 124. The cross-section of the distal cavity 125a may be circular, ovoid, polygonal or other shape and may vary in size, shape or other properties, along the length of the distal cavity 125a.

Figure 7:
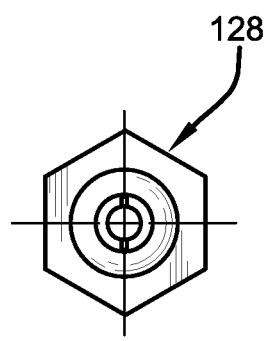
FIG. 7 is a component diagram illustrating one or more portions of one or more systems described herein.
Figure 8:
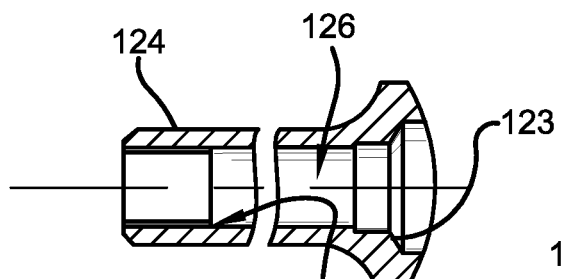
FIG. 8 is a component diagram illustrating one or more portions of one or more systems described herein.
Figure 9:
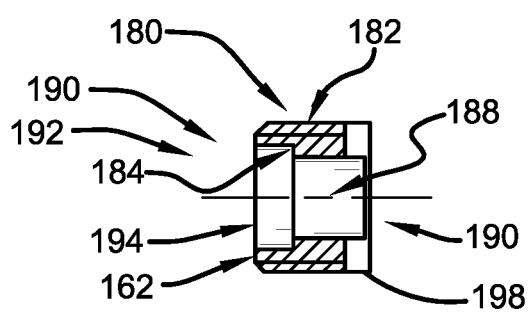
FIG. 9 is a component diagram illustrating one or more portions of one or more systems described herein.
Figure 10:
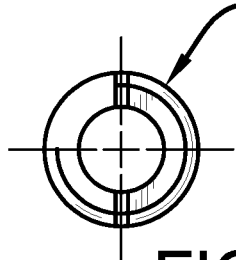
FIG. 10 is a component diagram illustrating one or more portions of one or more systems described herein.

As shown in FIGS. 6-8, in certain implementations, the internal passage 126 may comprise a variety of internal diameters, defining different cavities, including a proximal cavity 125b disposed at the proximal end. Without limitation, cavities 125a and 125b may differ in geometry, shape, and size. In certain implementations, cavities 125a and 125b are polygonal. In certain implementations, cavities 125a and 125b are both cylindrical and differ in diameter. In certain implementations, without limitation, as shown in FIGS. 6-8, the distal cavity 125a may comprise axial facing interior surfaces 121 or surfaces with facings having an axial component 123, which may act as sealing surfaces. In certain implementations, without limitation, as shown in FIGS. 6-8, axial facing interior surfaces 121 or surfaces with facings having an axial component 123 are positioned between cavities such as 125a and 125b.

In certain implementations, the cross-sectional area of the distal cavity 125a may be sufficiently large to at least partially accommodate a valve stem 207, such as disposed in a fluid source connection (e.g., see FIG. 4). In certain implementations, the valve body 120 may comprise an abutment surface 127 disposed on the exterior, that can be configured to contact against and/or form a seal with a facing surface (e.g., as shown in FIGS. 2 and 3) of pressure regulator 200. In certain implementations, the valve body 120 may comprise tool interface surface 128 disposed on its exterior, that can be configured to interface with a tool (not shown) during rotation, assembly, repair, refurbishment, installation, removal, or other operations performed with or upon the valve body 120 or the temperature-sensitive fluid flow interruption device 100. In certain implementations, the tool interface surface 128 may comprise at least part of a substantially regular polygonal shape adapted for use with a conventional wrench or socket (not shown). As shown in FIG. 7, in certain implementations, tool interface surface 128 may comprise parts of a regular hexagonal polygon. In certain implementations, the tool interface surface 128 is adapted to resist engagement of certain tools. In certain implementations, the tool interface surface 128 is adapted to resist tampering. In certain implementations, the tool interface surface 128 is adapted for engagement with tools adapted for use with tamper-resistant fasteners or security fasteners. In certain implementations, the tool interface surface 128 is adapted to substantially prevent or inhibit the use of tools not adapted for use with security fasteners. In certain implementations, the tool interface surface 128 is pentagonal or triangular and is adapted for use with pentagonal or triangular security fastener tools.

In certain implementations, the valve body 120 of the example system or device 100 may comprise a retention cap engagement component 129. The retention cap engagement component 129 can be configured to selectably, removably engage the retention cap 180. In certain implementations the retention cap engagement component 129 may comprise screw threads, surfaces or holes to accept pins, keys, clamps, clips or other mechanical fasteners, or other adaptations to selectably, removably engage the retention cap 180. In these implementations, the retention cap 180 can comprise complementary engagement components. In certain implementations the retention cap engagement component 129 may be adapted to accept the press fitted retention cap 180.

In one implementation, the displacement member 140 may comprise an elongated distal portion 148 that is configured and sized to appropriately, and slidably engage with the internal passage 126 of the valve body 120. The elongated distal portion 148 can be configured to selectably engage with Schrader-type valve 204 in a connection to a fluid source. The displacement member 140 may comprise a displacement member longitudinal axis 147, the elongated distal portion 148, a proximal end 149, a flange 142, and a displacement member shoulder 144. The elongated distal portion 148 can be configured for selectable engagement with a Schrader-type valve 204, or for selectable engagement with a component of a Schrader-type valve 204, such as, without limitation, a valve stem 207.

In one implementation, the displacement member 140 can optionally comprise a gasket holder area 146 (e.g., O-ring retention geometry), that is configured to selectably retain a gasket in engagement with the displacement member 140. In certain implementations the displacement member 140 may comprise a pin, shaft, stick, prong, probe, spindle, arbor, bar, bolt, or other elongated member. In certain implementations the displacement member 140 may comprise a metal, metal alloy, or combination thereof. In certain implementations the displacement member 140 may comprise a polymer, a eutectic alloy or a linear low density polyethylene (LLDPE). In certain implementations, the displacement member 140 may comprise materials that have material properties that are substantially affected by temperature. In certain implementations the displacement member 140 may comprise materials that have material properties that change substantially as temperature changes between temperatures below a predetermined temperature and temperatures above a predetermined temperature. In certain implementations, the displacement member 140 may comprise materials that have material properties that change substantially as temperature changes between temperatures below a predetermined temperature and temperatures above a predetermined temperature; wherein the material properties comprise at least one of modulus of elasticity, yield strength, static coefficient of friction with respect to the surface material of the elongated portion 126, dynamic coefficient of friction with respect to the surface material of the elongated portion 126, coefficient of thermal expansion, compressive strength, tensile strength, and shear strength.

In one implementation, the biasing component 160 may comprise a type of spring that produces a biasing force against components with which it is engaged. In some implementations, the biasing component 160 is elongated and may comprise a longitudinal axis, a proximal end 110 and a distal end 108. In certain implementations, the biasing force may be a non-linear function of displacement of the proximal end 110 with respect to the distal end 108, a quadratic function of displacement of the proximal end 110 with respect to the distal end 108, a linear function of displacement of the proximal end 110 with respect to the distal end 108, or have some other relationship to displacement of the proximal end 110 with respect to the distal end 108. In certain implementations, the biasing force of the biasing component 160 is a function of displacement of the proximal end 110 with respect to the distal end 108 and is also a function of the temperature of biasing component 160. In certain implementations, biasing component 160 may comprise a coil biasing component, a leaf biasing component, a compression biasing component, a tension biasing component, a cupped biasing component washer, an elastomer, or combinations thereof.

Without limitation, the biasing force of the coil biasing components and leaf biasing components often comprises a substantially linear function of displacement of the proximal end 110 with respect to the distal end 108. In certain implementations, the biasing component 160 may comprise a polymer, metal, metal alloy, or combination thereof. In certain implementations, the biasing component 160 may comprise a eutectic alloy or a linear low density polyethylene (LLDPE). In certain implementations, the biasing component 160 may comprise materials that have material properties that are substantially affected by temperature. In certain implementations, the biasing component 160 may comprise materials that have material properties that change substantially as temperature changes between temperatures below a predetermined temperature and temperatures above a predetermined temperature. In certain implementations, the biasing component 160 may comprise materials that have material properties that change substantially as temperature changes between temperatures below a predetermined temperature and temperatures above a predetermined temperature; wherein said material properties comprise at least one of modulus of elasticity, yield strength, static coefficient of friction with respect to the surface material of the elongated portion 126, dynamic coefficient of friction with respect to the surface material of the elongated portion 126, coefficient of thermal expansion, compressive strength, tensile strength, and shear strength.

In certain implementations, a retention cap 180 may comprise valve engagement components 182 adapted for selectable removable engagement with a retention cap engagement component 129 of valve body 120. In certain implementations, valve engagement components 182 comprise threads, or other adaptations to removably engage retention cap engagement component 129. In certain implementations, a retention cap 180 may comprise a retention cap biasing component retention surface 184 configured to engage with a proximal end 110 of biasing component 160.

In certain implementations, a retention cap 180 may comprise a tool interface region 186 adapted for engagement with tool (not shown). In certain implementations, a retention cap 180 is adapted to capture, or act as a barrier to, or substantially resist the passage of the displacement member flange 142. The tool interface region 186 may be engaged with a tool during rotation, assembly, repair, refurbishment, installation, removal, or other operations performed with or upon the tool interface region 186, the retention cap 180, the valve body 120, or the temperature-sensitive fluid flow interruption device 100. In certain implementations, the tool interface region 186 is adapted to resist engagement of certain tools. In certain implementations, the tool interface region 186 is adapted to resist tampering. In certain implementations, the tool interface region 186 is adapted for engagement with tools adapted for use with tamper-resistant fasteners or security fasteners. In certain implementations, the tool interface region 186 is adapted to substantially prevent the use of tools not adapted for use with security fasteners. In certain implementations, the tool interface region 186 is adapted for use with tools adapted for use with security fasteners comprising, spanner fasteners, Phillips pin-head fasteners, socket pin-head fasteners, various other pin-head fasteners, other tamper-resistant fasteners.

In certain implementations, the retention cap 180 can be configured to receive at least a portion of the biasing component 160, and engage the biasing component 160 with an internal shoulder 184. Further, retention cap 180 can be configured to receive at least a portion of the biasing component 160 at a cap shoulder stop 162, within elongated portion 126 by acting as a removable barrier to removal of biasing component 160. In certain implementations, the retention cap 180 may comprise an internal cavity 188 adapted to permit axial insertion and passage therethrough of displacement member 140 or components of the displacement member 140.

In certain implementations, the displacement member 140 is axially inserted, at least partially, into the internal passage 126 of the valve body 120. In certain implementations, the displacement member 140 forms a press fit with the interior surface of the elongated portion 126. That is, for example, the displacement member is fixedly engaged with the interior sides of the elongated portion 126, and held in place by friction fit, which is sufficient to overcome the Schrader-type valve biasing force. In certain implementations in which the displacement member 140 is engaged with a gasket, the gasket has a press fit with respect to the displacement member 140 and the O-ring has a press fit with respect to the internal passage 126. In certain implementations, the forces involved in the press fit between two members may be sufficient to retain and thereby axially position the fitted members with respect to one another. In certain implementations, the displacement member 140 forms a clearance fit with the interior surface of the internal passage 126. As an example, the displacement member 140 may be subjected to elevated temperatures that deform or loosen the press-fit placement, resulting in the clearance fit disposition. Biasing component 160 may comprise a proximal end 110 operatively engageable with a displacement member shoulder 144 of the displacement member 140. Biasing component 160 also may comprise a distal end 108. The distal end 108 may be operatively engageable with a retention cap shoulder (e.g., or internal shoulder 184) of retention cap 180. The valve engagement components 182 of retention cap 180 can selectably engage retention cap 180 with retention cap engagement component 129 of valve body 120.

In certain implementations, displacement member 140 may be axial located by axially locating flange 142 against an axial facing interior surfaces 121 or surfaces with facings having an axial component 123. Flange 142 may be located against an axial facing interior surfaces 121 or surfaces with facings having an axial component 123 by biasing the flange 142 against the surface or surfaces with forces from biasing component 160 or from force from the retention cap 180 exerted directly or indirectly upon the flange 142, or displacement member 140 or components thereof.

In certain implementations, the engagement of the displacement member 140 with the internal passage 126 is a function of temperature. In certain implementations, the displacement member 140 occupies, at least partially, the internal passage 126; at temperatures below a predetermined temperature, the fit between the displacement member 140 and the at least partially occupied internal passage 126 is a press fit; at temperatures above a predetermined temperature, the fit between the displacement member 140 and the at least partially occupied internal passage 126 is a clearance fit.

In certain implementations, the displacement member 140 engages the Schrader-type valve 204 or an element engaged to the Schrader-type valve 204 to the biasing component 160 and thereby, to the retaining cap 108 and, thereby to the valve body 120, and thereby, to the internal passage 126. In certain implementations, a high stiffness of the displacement member 140 produces a firm assembly of parts and components between the displacement member 140 and the retention cap 180. In certain implementations, the biasing component 160 engages the displacement member 140 to the retaining cap 108 and, thereby to the valve body 120, and thereby, to the elongated portion 126. A high stiffness of the biasing component produces a hard assembly of the biasing component 160 and the displacement member 140; that is, the assembly is "firm" in that large forces or stresses are required to produce small strains or displacements between at least one element of the displacement member 140 and at least one element of the elongated portion 126.

Figure 11:
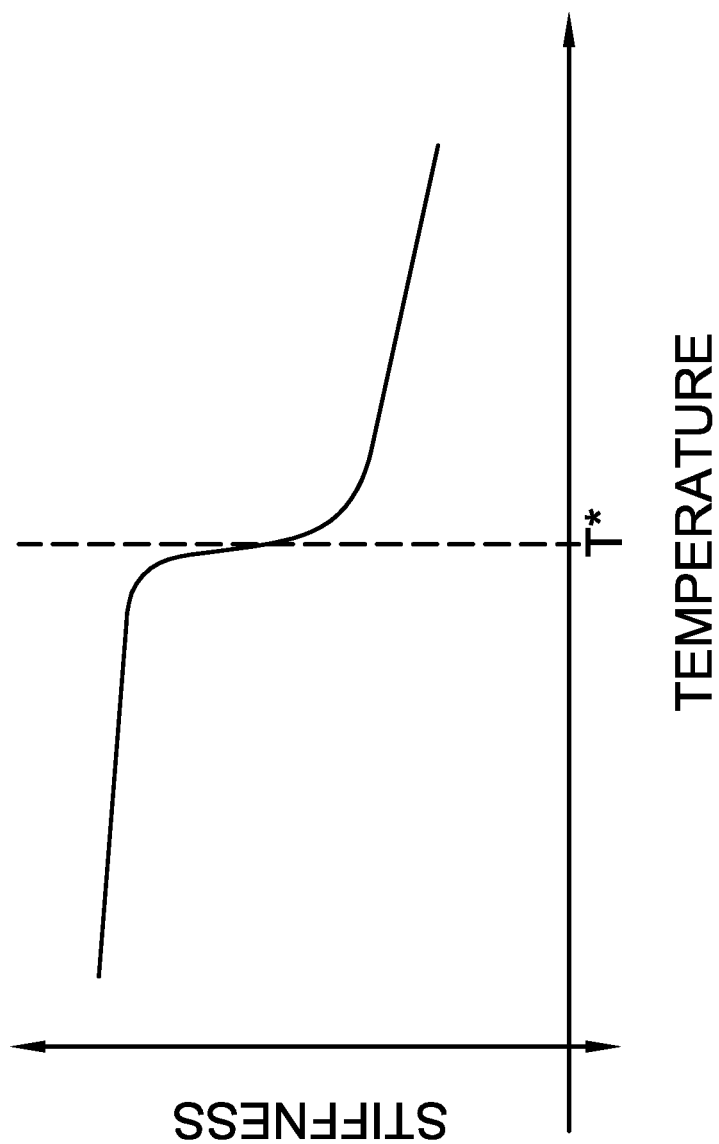
FIG. 11 is a graph illustrating a function that substantially approximates one or more portions of one or more systems described herein.

In certain implementations, the performance of biasing component 160 is a function of temperature. In certain implementations, the restorative force of the biasing component 160 is a function of displacement of the first biasing component end 162 with respect to the second biasing component end 164 and is also a function of the temperature of biasing component 160. In certain implementations, the stiffness of the biasing component 160 is substantially constant at a given temperature. At temperatures below a predetermined temperature, the biasing component 160 has a high stiffness. At temperatures above a predetermined temperature, the biasing component 160 has a low stiffness. In certain implementations, the stiffness of the biasing component 160 is a substantially linear function of temperature. In certain implementations, the stiffness of the biasing component 160 substantially approximates a step-wise function of temperature; that is the stiffness of the biasing component 160 changes dramatically over a short temperature range. For sake of illustration, and without limitation, a function that substantially approximates a step-wise function of stiffness with respect to temperature is illustrated in FIG. 11.

Device temperatures may change after assembly. Accordingly, in some circumstances, the temperature-sensitive fluid flow interruption device 100 may be assembled with fluid supply 202 at a temperature below the predetermined temperature and the assembly may subsequently attain a temperature above the predetermined temperature. Similarly, in some circumstances, the temperature-sensitive fluid flow interruption device 100 may be assembled with fluid supply 202 at a temperature above the predetermined temperature and the assembly may subsequently attain a temperature below the predetermined temperature. In either case, the functionality of the assembly at the time of assembly may differ from the functionality of the assembly once its temperature changes.

In some circumstances a temperature-sensitive fluid flow interruption device 100 that performs as a firm assembly is connected to a fluid supply 202 comprising a normally-closed Schrader-type valve 204 at a temperature below the predetermined temperature in a manner to permit fluid flow. Such assembly will subject the Schrader-type valve 204 and the displacement member 140 to force greater than the Schrader-type valve closure force and will displace the plug 206 from its closed position in order to open the valve to permit fluid flow. If the connected temperature-sensitive fluid flow interruption device 100 subsequently attains a temperature above the predetermined temperature, the temperature-sensitive fluid flow interruption device 100 will cease functioning as a hard assembly and will begin functioning as a soft assembly; consequently, the force between the Schrader-type valve 204 and the displacement member 140 will suffice to displace the displacement member 140 from its position within elongated portion 126, sliding displacement member 140 further into elongated portion 126, and allowing the Schrader-type valve closure force to return the plug 206 to the closed position and to close the valve to fluid flow.

In some circumstances a temperature-sensitive fluid flow interruption device 100 that performs as a soft assembly is connected to a fluid supply 202 comprising a normally-closed Schrader-type valve 204 at a temperature above the predetermined temperature. Such assembly cannot be relied upon to open the valve in a manner that is non-transient because the soft assembly state of the temperature-sensitive fluid flow interruption device 100 will cause the internal forces of assembly to displace the displacement member 140 from its position within elongated portion 126 and allow closure of the Schrader-type valve 204 by closure forces either immediately or very shortly after assembly. If the connected temperature-sensitive fluid flow interruption device 100 subsequently attains a temperature below the predetermined temperature, the temperature-sensitive fluid flow interruption device 100 will cease functioning as a soft assembly and will begin functioning as a hard assembly; however, the displaced displacement member 140 will not spontaneously return to its pre-displacement position; it will stay in the valve-closed position. Consequently, the force between the Schrader-type valve 204 and the displacement member 140 will not be sufficient to open the valve to fluid flow.

The temperature of the temperature-sensitive fluid flow interruption device 100 may change or fluctuate. The temperature-sensitive fluid flow interruption device 100 may attain temperatures above the predetermined temperature for many reasons. Without limitation, the temperature-sensitive fluid flow interruption device 100 may attain temperatures above the predetermined temperature due to elevation of environmental temperatures due to nearby fire, flames, or combustion. In certain implementations, the predetermined temperature is similar to temperatures attained during combustion in air at one atmosphere of propane, propene, MAPP gas, methylacetylene-propadiene, natural gas, methane, ethane, butane, liquid petroleum gas, hydrogen, HCNG, town gas, syngas, wood gas, or mixtures thereof. In certain implementations, the predetermined temperature is similar to the maximum safe storage temperature of the lower of the bottle or for the fluid within the bottle. In certain implementations, the predetermined temperature is between 136 degrees Fahrenheit and 940 degrees Fahrenheit.

In the example implementation illustrated in FIG. 2 the temperature-sensitive fluid flow interruption device 100 is engaged with a pressure regulator 200. Pressure regulator 200 may comprise an opening 216 that is aligned for engagement with the connector 203 of fluid supply 202. When engaged, the engagement of pressure regulator 200 with fluid supply 202 engages the temperature-sensitive fluid flow interruption device 100 with the Schrader-type valve 204. In FIG. 2, the temperature-sensitive fluid flow interruption device 100 is shown in a state that, if the temperature of the device is below the predetermined temperature, will open the Schrader-type valve 204 if engaged therewith; the displacement member 140 is shown extending from the valve body 120 such that engagement with Schrader-type valve 204 will depress the valve stem 207, move the plug 206 out of its closed position and, thereby, to open the valve to permit fluid flow.

In the example implementation illustrated in FIG. 3 the temperature-sensitive fluid flow interruption device 100 is engaged with a pressure regulator 200. Pressure regulator 200 may comprise an opening 216 that is engaged with the connector 203 of fluid supply 202. The engagement of pressure regulator 200 with fluid supply 202 engages the temperature-sensitive fluid flow interruption device 100 with the Schrader-type valve 204. As shown in detail in FIG. 4, the temperature-sensitive fluid flow interruption device 100 is in its flow interruption state; the displacement member 140 is shown recessed into the valve body 120 such that engagement with Schrader-type valve 204 will not depress the valve stem 207, will not move the plug 206 out of its closed position and, will not open the valve to permit flow.

While the temperature-sensitive fluid flow interruption device 100 has been described above in connection with the certain implementations, it is to be understood that other implementations may be used or modifications and additions may be made to the described implementations for performing the same function of the temperature-sensitive fluid flow interruption device 100 without deviating therefrom. Further, the temperature-sensitive fluid flow interruption device 100 may include implementations disclosed but not described in exacting detail. Further, all implementations disclosed are not necessarily in the alternative, as various implementations may be combined to provide the desired characteristics. Variations can be made by one having ordinary skill in the art without departing from the spirit and scope of the wall mount system. Therefore, the temperature-sensitive fluid flow interruption device 100 should not be limited to any single implementation, but rather construed in breadth and scope in accordance with the recitation of the attached claims.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

In another aspect, an alternate implementation of a device or system may be devised that can also be used to interrupt flow of fluid from a fluid source (e.g., fuel source) to a target device (e.g., a device using combustion of fuel). In this aspect, the sacrificial component can be disposed at an alternate location in the fluid intake valve, where the sacrificial component can deform when exposed to predetermined, elevated temperatures to interrupt the fluid flow. As an example, the deformation of the sacrificial component in the intake valve can result in displacement of another component that results in interruption of the fluid flow from the fluid source. Further, for example, replacement of the sacrificial component with an appropriate replacement part may allow the intake valve to return to functioning state.

FIGS. 12-17 are a component diagram illustrating example alternate implementations of a device for interrupting flow of fluid from a fluid source. In this example implementation, a body 1202 comprises an internal passage 1214. A displacement member 1206 is disposed in the internal passage 1214, and is configured to engage a valve in a connection to a fluid source, for example, to allow for passage of fluid from the source through the example intake valve.

Figure 12:
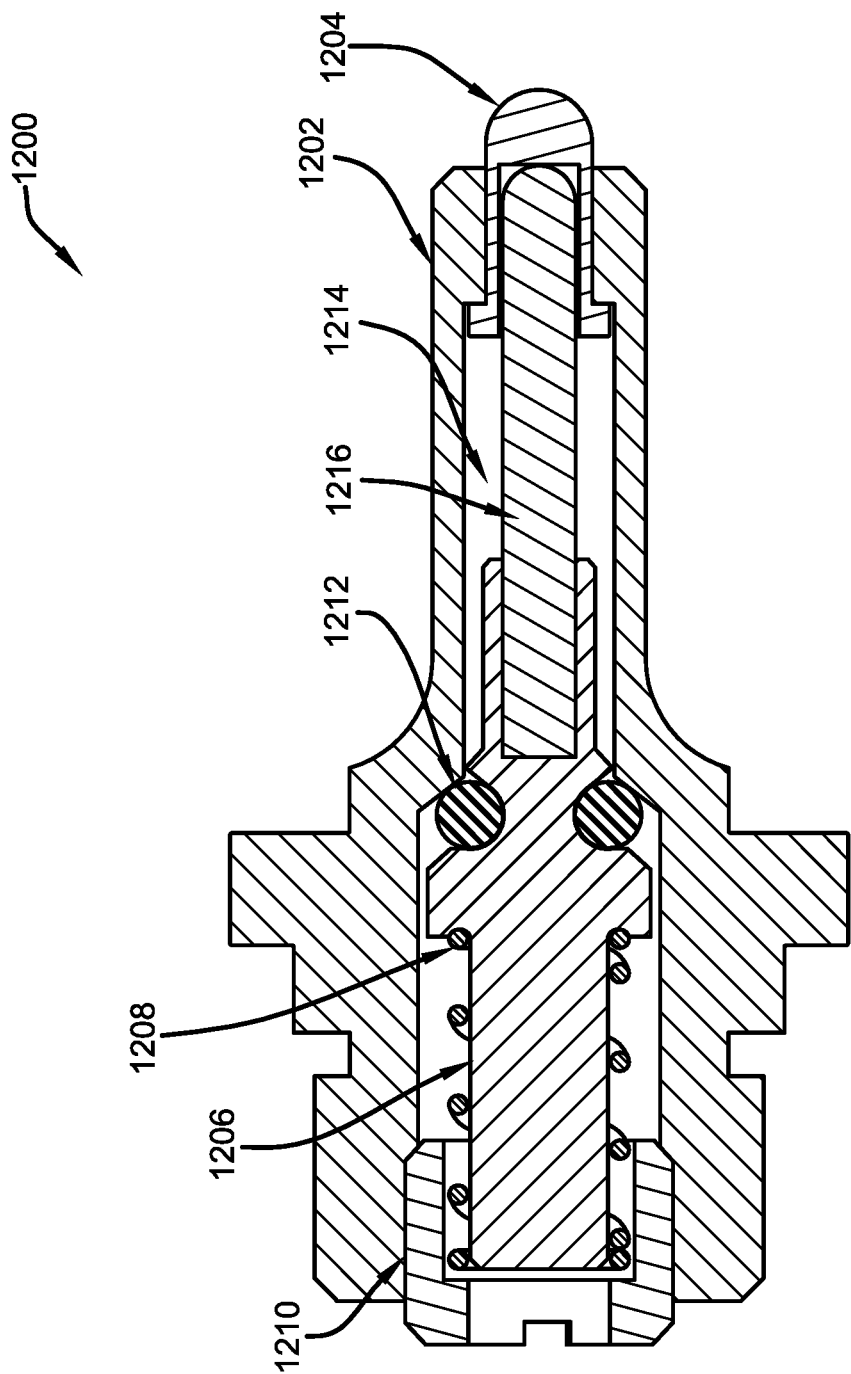
FIG. 12 is a sectional view of an alternate implementation of a temperature-sensitive fluid flow interruption device.
Figure 15A:
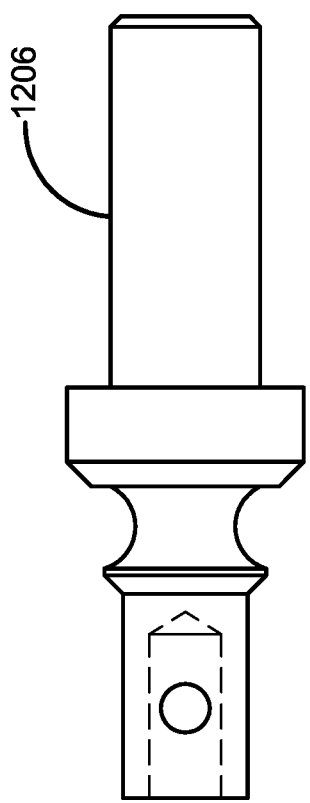
FIGS. 15A and 15B are a component diagrams illustrating one or more portions of one or more systems described herein.
Figure 15B:
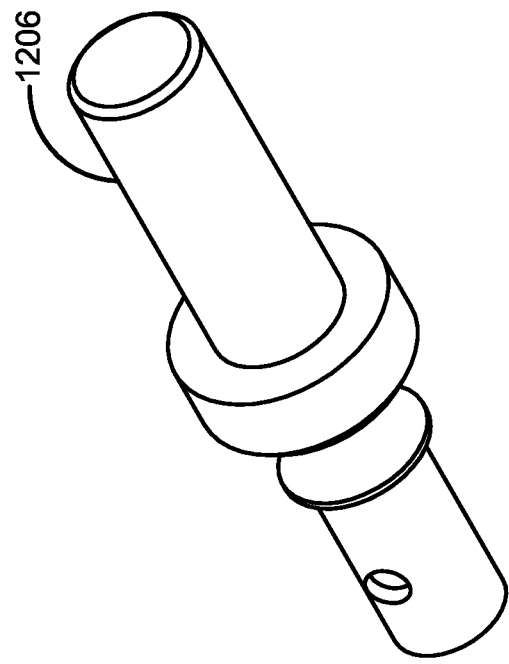
Figure 16B:
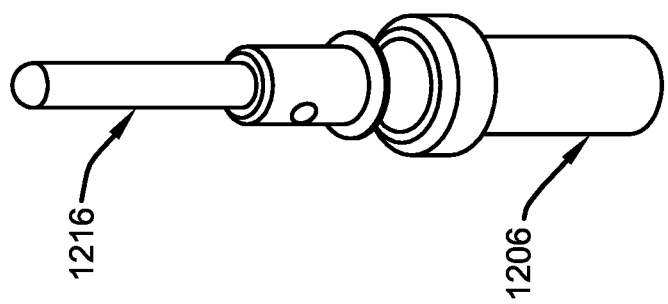
FIGS. 16A and 16B are a component diagrams illustrating one or more portions of one or more systems described herein.
Figure 16A:
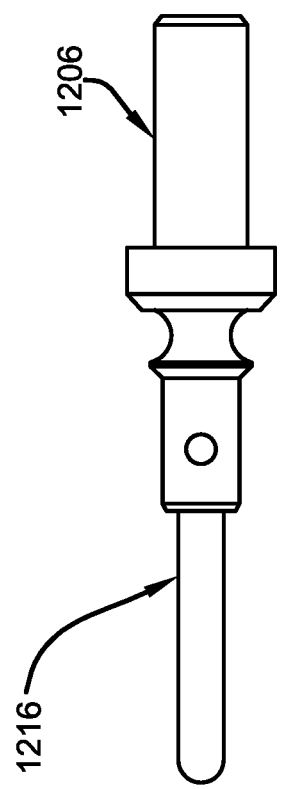

As illustrated in FIGS. 12, 13C, and 16A, in this implementation, the displacement member 1206 comprises a sacrificial member 1216, which can be an elongated component coupled with the displacement member 1206. In one implementation, the sacrificial member 1216 may be fixedly coupled with the displacement member 1206. For example, the sacrificial member 1216 can be formed (e.g., injection molded) in the displacement member 1206. In another implementation, the sacrificial member 1216 can be merely loosely fitted in contact with the displacement member 1206. For example, the sacrificial member 1216 may be configured to rotate in a chamber disposed at the distal end of the displacement member 1206 sized to receive the sacrificial member 1216.

Further, in this implementation, as illustrated in FIGS. 12, 13C, 17A, 17B, and 17C, a displacement member tip 1204 can be disposed in the internal passage 1214, in contact with the sacrificial member 1216 of the displacement member 1206. In this implementation, at least a portion of the displacement member tip 1204 can extend from the distal end of the internal passage 1214. For example, the portion of the displacement member tip 1204 extending from the internal passage 1214 can be configured to selectably engage with the valve disposed in the fluid source connection. That is, for example, the displacement member tip 1204 may contact the Schrader-type valve disposed in the connection to the fluid source, such as to cause the Schrader-type valve to open to allow fluid flow.

In this implementation, as illustrated in FIGS. 12 and 13C, the example device can comprise a biasing component 1208, such as a spring that is configured to bias the displacement member 1206 toward the distal end of the intake valve. Further, the example device can comprise a retention cap 1210 disposed at the proximal end of the device. The retention cap 1210 can be configured to selectably engage with the body 1202 of the device, and provide a proximal stop for the biasing component 1208. Additionally, the example device can comprise a gasket 1212 disposed between the displacement member 1206 and the wall of the internal passage 1214.

As an example, the biasing component 1208 can be configured to provide a biasing force that biases the displacement member, and hence the sacrificial member 1216 and displacement member tip 1204 toward the distal end of the example, device. In this example, the biasing force can be greater than a Schrader-type valve biasing force, to which the example device may be coupled. In this way, the example intake valve device can be engaged with the Schrader-type device in a connection to a fluid source, resulting in fluid flow from the source to the intake valve device. Further, as one example, the connection between the example, device and the Schrader-type valve can utilize complementary threads. This type of engagement typically involves rotating at least one of the two components to couple them together. In this implementation, the arrangement of the displacement member 1206, the sacrificial member 1216, and the displacement member tip 1204 may allow for the displacement member tip 1204 and/or the sacrificial member 1216 to rotate when contacting the Schrader-type valve member. For example, this arrangement can mitigate binding of the sacrificial member 1216, thereby mitigating undesired twisting or deformation of the sacrificial member 1216 during coupling.

In one implementation, the sacrificial member 1216 can be configured to deform at a pre-determined (e.g., elevated) temperature. In this example, the deformation at the pre-determined temperature of the sacrificial member 1216 may the Schrader-type valve biasing force to overcome the biasing force of the displacement member. In this example, the resulting deformation may allow the Schrader-type valve to close, thereby interrupting the fluid flow from the fluid source.

In another aspect, another alternate implementation of a device or system may be devised that can also be used to interrupt flow of fluid from a fluid source to a target device. In this aspect, the sacrificial component can be disposed at another alternate location in the fluid intake valve, where the sacrificial component can deform when exposed to predetermined, elevated temperatures to interrupt the fluid flow.

Figure 18:
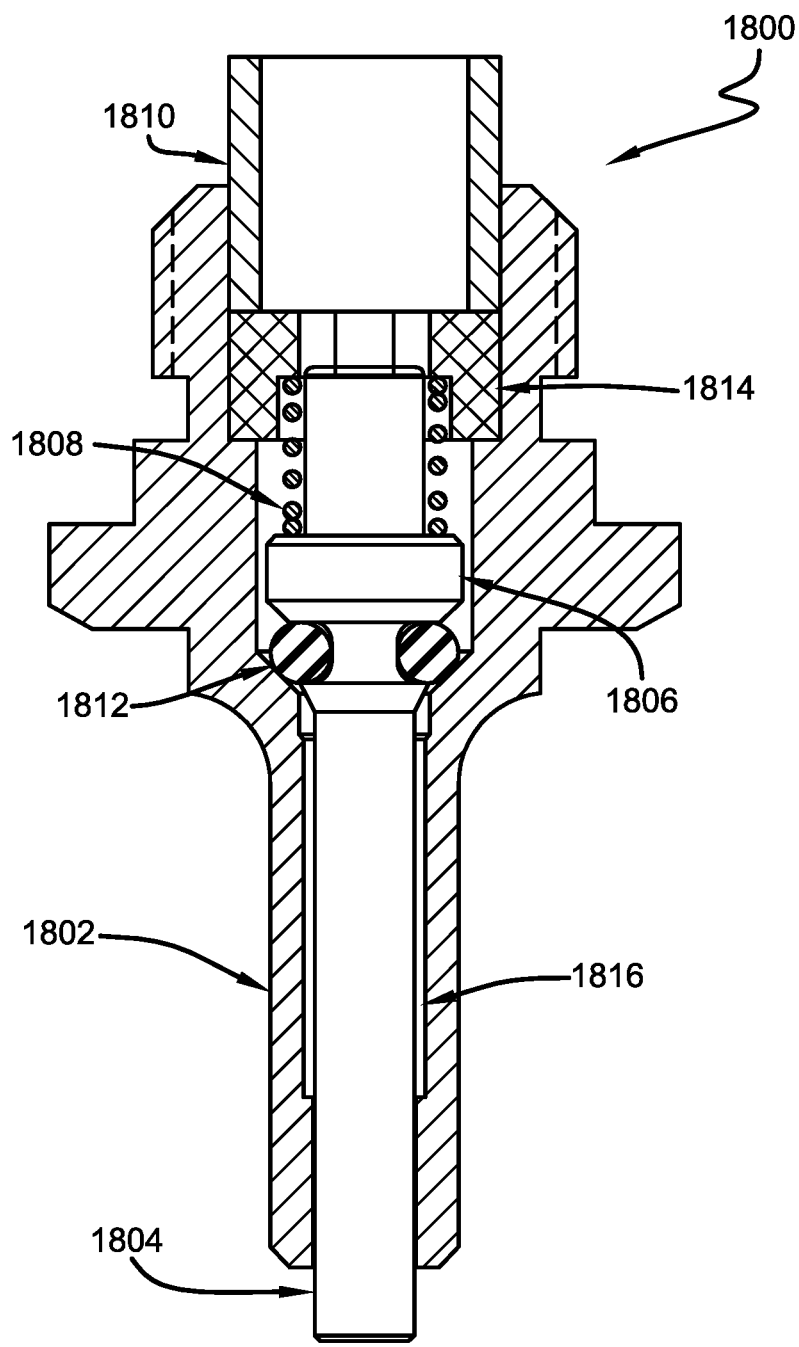
FIG. 18 is a component diagram illustrating an implementation of one or more portions of one or more systems described herein.
Figure 19:
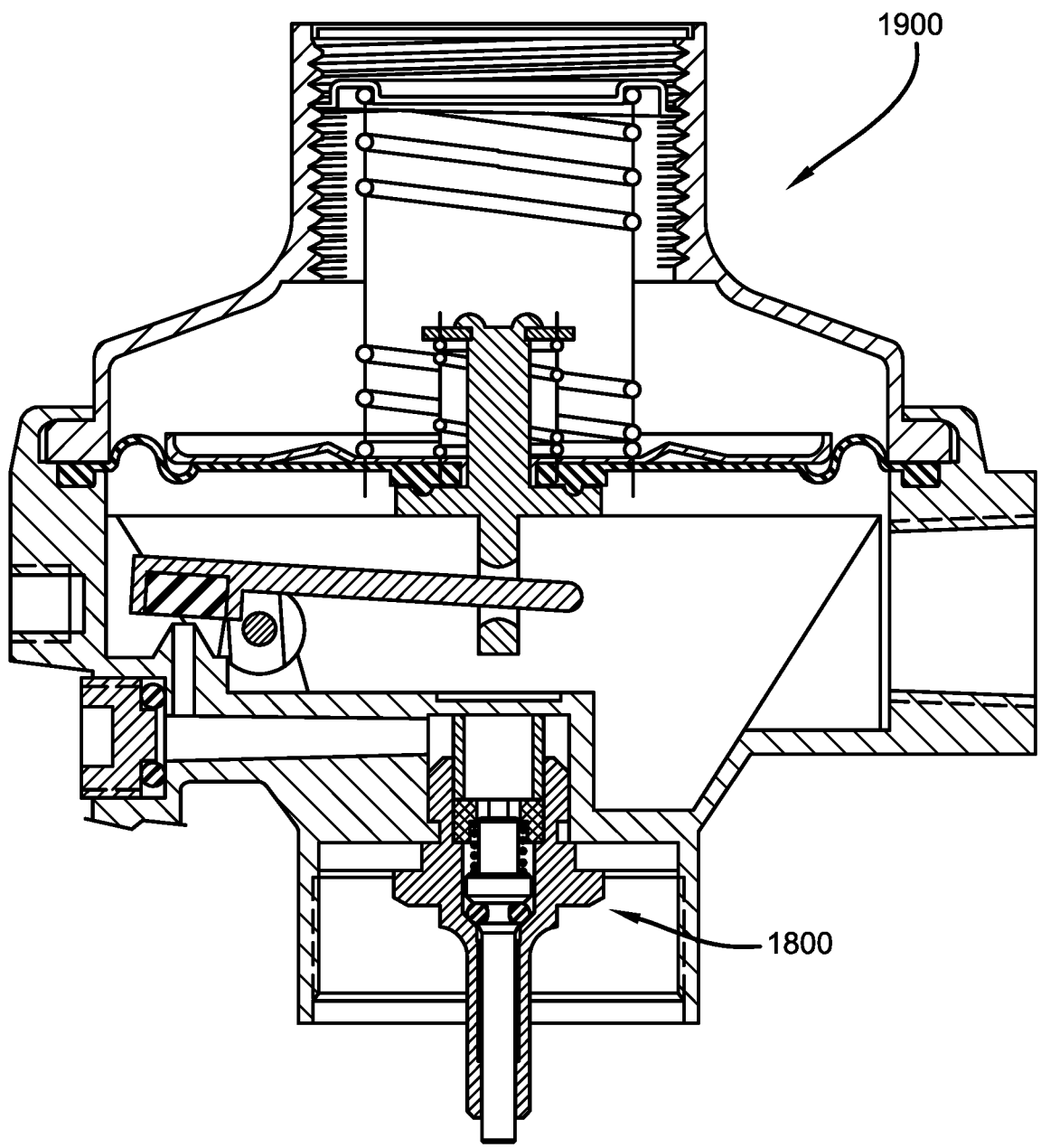
FIG. 19 is a component diagram illustrating an implementation of example system where one or more portions of one or more systems described herein may be utilized.

FIGS. 18 and 19 are component diagrams illustrating another alternate implementation 1800 of a device for interrupting flow of fluid from a fluid source to a target device. In this implementation 1800, the body 1802 comprises an internal passage 1816, a retention cap 1810, a biasing component 1808, gasket 1812, displacement member 1806, and displacement member tip 1804. In this implementation, a sacrificial component 1814 is disposed between, and in contact with, the biasing component 1808 and the retention cap 1810.

As described above, and illustrated in FIG. 19, the example device 1800 can be coupled with a target device intake connection 1900, such as a regulator (e.g., or other connection). Further, the target device intake connection 1900 can be coupled (e.g., threadedly coupled) with a fluid source, such as a tank or coupler comprising a Schrader-type valve. In this example, the displacement member tip 1804 can contact the Schrader-type valve, and the biasing force of the biasing component 1808 can be configured to displace the Schrader-type valve to allow fluid flow from the source, to the target device intake connection 1900.

As an example, when subjected to a pre-determined elevated temperature, the sacrificial component 1814 can be configured to deform (e.g., melt). The deformation of the sacrificial component 1814 may displace the biasing component 1808, which, in turn, can result in displacement of the displacement member 1806 toward the proximal end. In this example, the displacement proximally of the displacement member 1806 may result in the displacement member tip 1804 disengaging (e.g., or at least no longer providing enough force to overcome the biasing force of) the Schrader-type valve). In this example, the Schrader-type valve may be allowed to close, thereby mitigating fluid flow from the source.

In one aspect, another alternate implementation of a device or system may be devised that can be used to interrupt flow of fluid from a fluid source to a target device. In this aspect, the sacrificial component can comprise an alternate configuration, and location in the fluid intake valve, where the sacrificial component can deform when exposed to predetermined, elevated temperatures to interrupt the fluid flow.

In one implementation, in this aspect, as illustrated in FIGS. 20-24, the example temperature sensitive component 2008 can be disposed at the proximal end of the subject intake valve 2000. In this implementation, the example intake valve 2000 can comprise a valve body 2001, which can comprise an intake passage 2102. The intake passage 2102 can be configured to receive a flow of fluid (e.g., gas or liquid, such as fuel, or other combustible product) from a fluid source 2402. The valve body 2001 can also comprise a valve chamber 2103 configured to receive fluid from the intake passage 2102, and to direct the flow of fluid between intake passage 2102 and a pressurized fluid intake component 2401 (e.g., regulator).

Figures 21A, 21B:
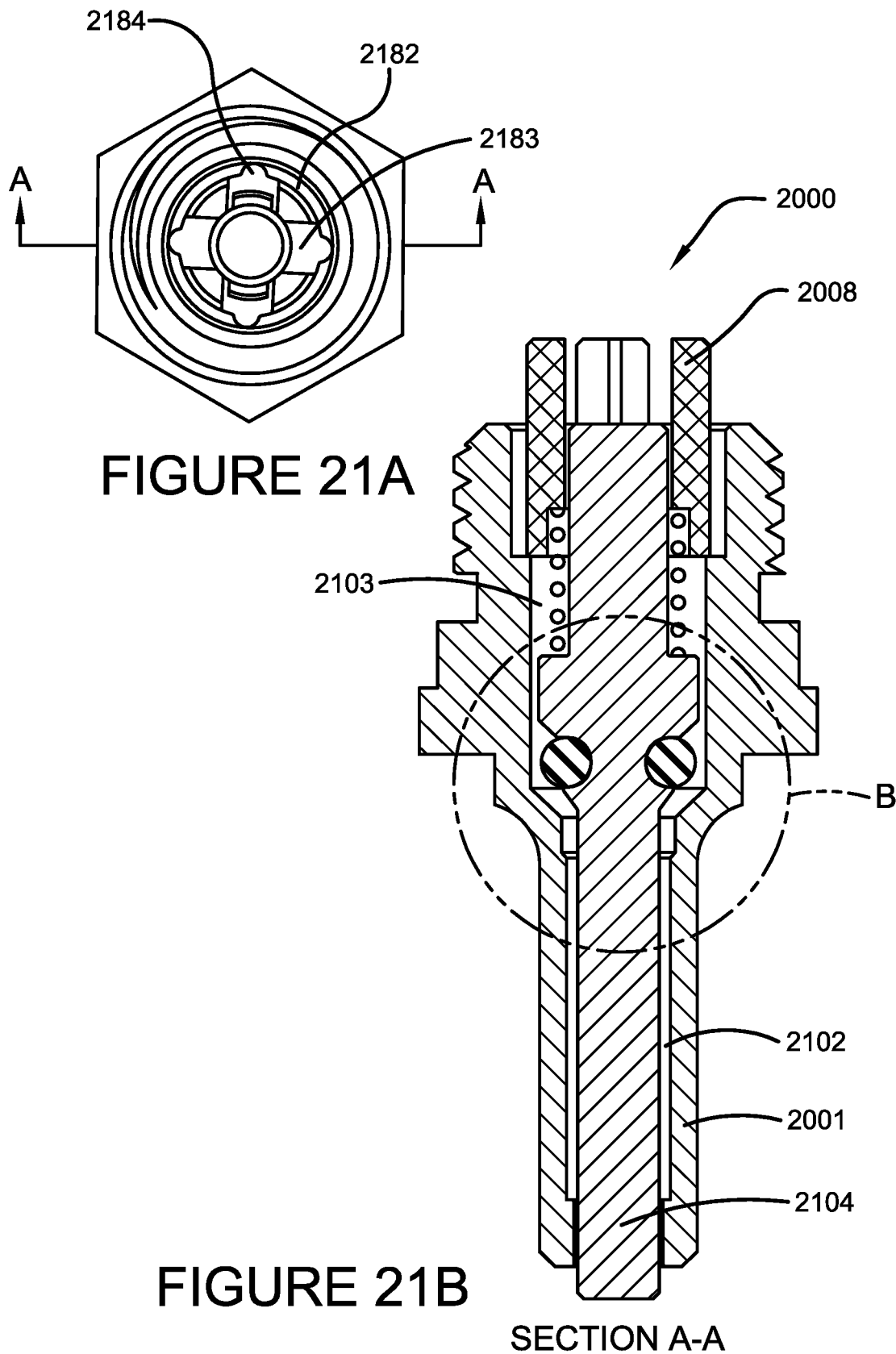
FIGS. 21A and 21B are component diagrams illustrating an alternate example intake valve where one or more portions of one or more systems described herein may be utilized.
Figure 22:
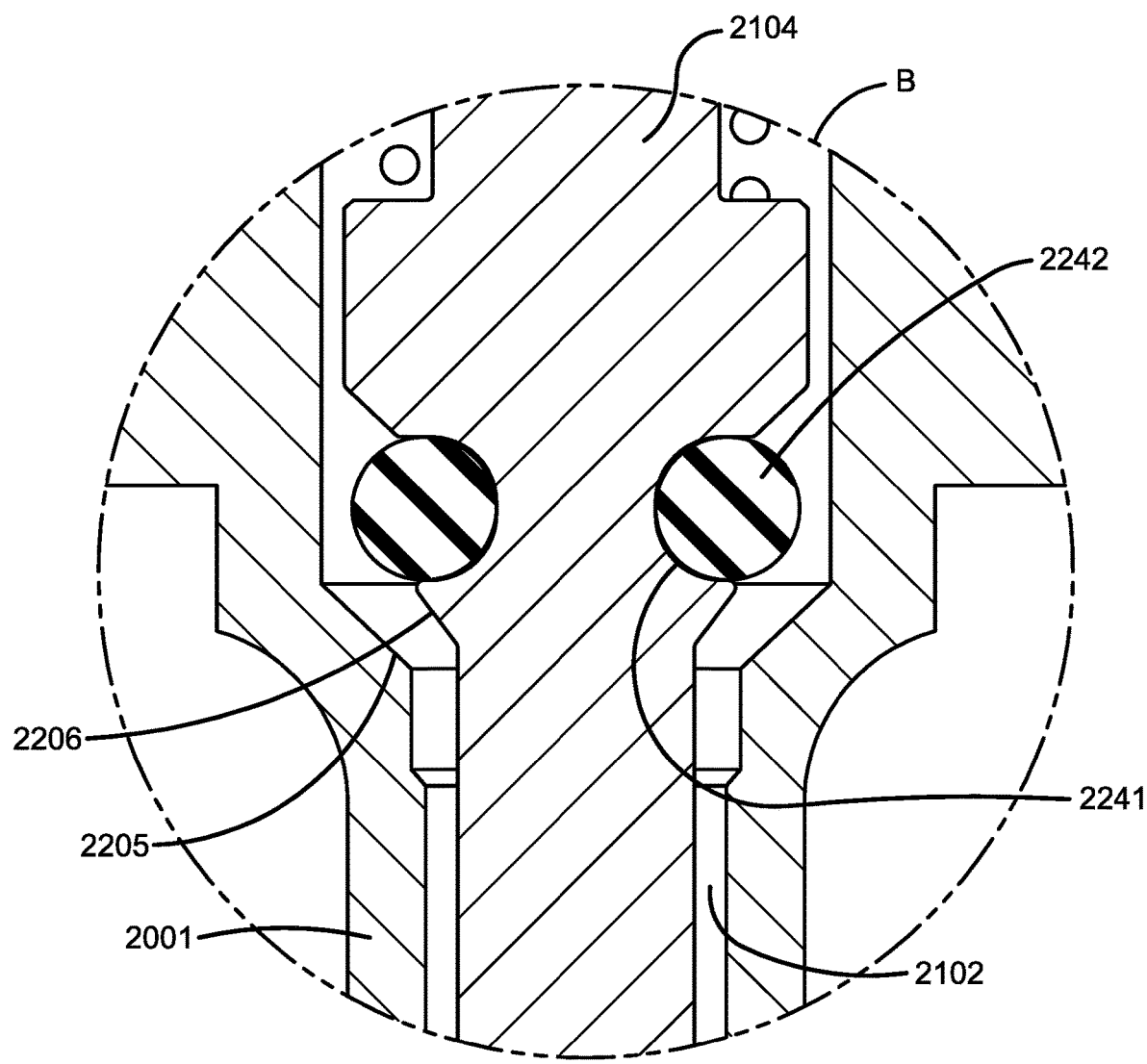
FIG. 22 is a component diagram illustrating a portion of an alternate implementation of an example intake valve where one or more portions of one or more systems described herein may be utilized.

As illustrated in FIG. 22, with continued reference to FIGS. 20, 21, 23, and 24, a displacement member 2104 (e.g., valve needle) can be disposed in the intake passage 2102 and valve chamber 2103, and be configured to slidably translate inside the valve body 2001. The displacement member 2104 can comprise a sealing step 2206, which is configured to seat in a corresponding step recess 2205 in the interior of the valve body 200, between the intake passage 2102 and the valve chamber 2103. Further, the displacement member 2104 can comprise an annular groove 2241, adjacent to the sealing step 2206, which, in conjunction with a gasket 2242 (e.g., O-ring), can provide a seal between the intake passage 2102 and the valve chamber 2103.

Figure 23:
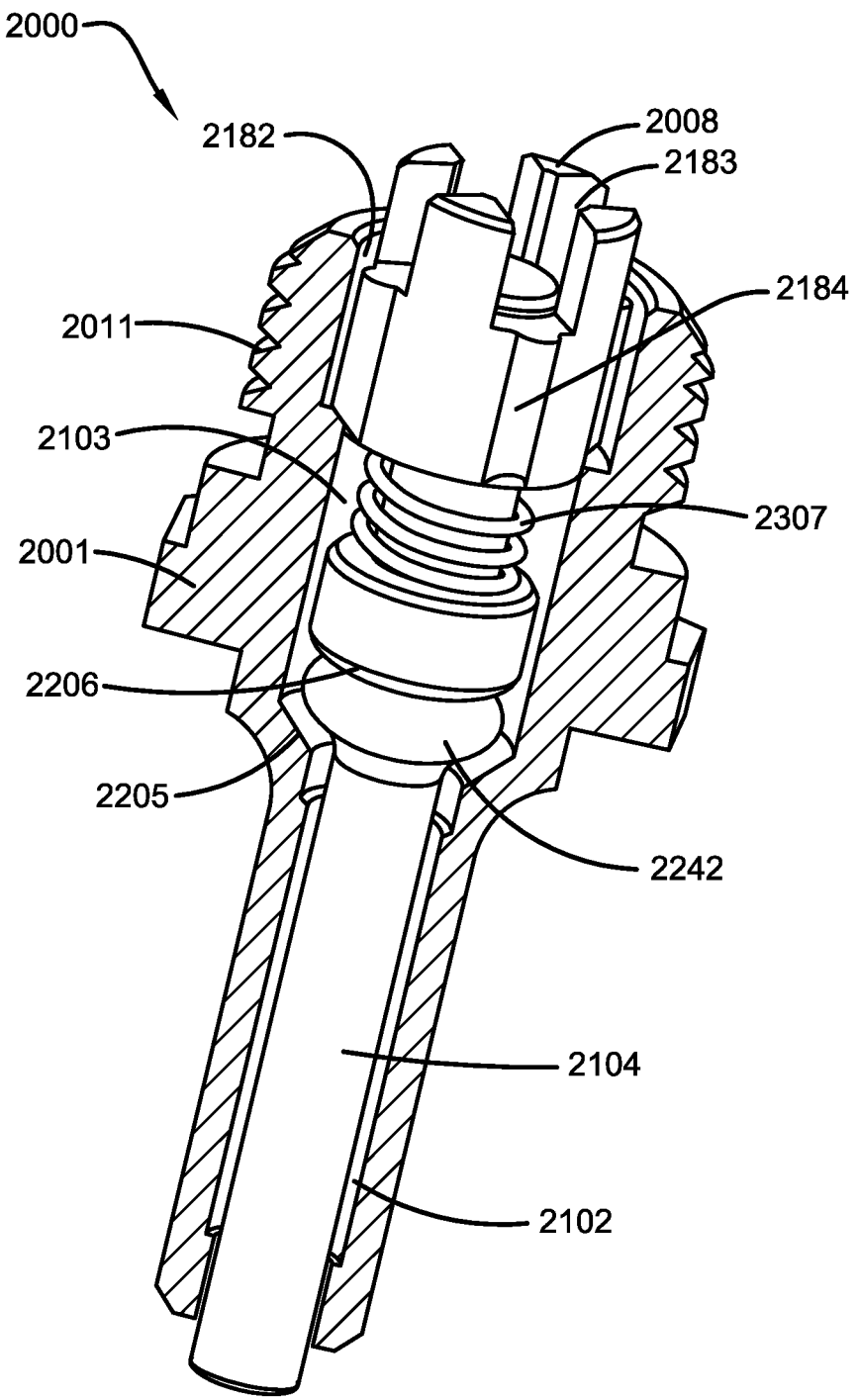
FIG. 23 is a component diagram illustrating an alternate implementation of an example intake valve where one or more portions of one or more systems described herein may be utilized.

As illustrated in FIG. 23, a biasing component 2307 (e.g., spring) can be disposed in contact with the displacement member 2104 at a shoulder in the valve chamber 2103, at the distal end of the biasing member 2307. The proximal end of the biasing member 2307 can be disposed in contact with the temperature sensitive component 2008. In this implementation, the temperature sensitive component 2008 (e.g., sacrificial component) can be disposed in the valve body 2001, at its proximal end, to form a fluid flow gap 2182 between the temperature sensitive component 2008 and the interior wall of the valve body 2001. The fluid flow gap 2182 can fluidly communicate with the valve chamber 2103 to the proximal end of the example valve 2000.

Further, as illustrated in FIGS. 21A and 21B, the temperature sensitive component 2008 can comprise a central opening the is configured to receive the proximal end of displacement member 2104, such that the temperature sensitive component 2008 seats on the displacement member 2104, and is in contact with the biasing member 2307. The temperature sensitive component 2008 can comprise a plurality of projections 2184 arranged around the perimeter of the temperature sensitive component 2008. In this implementation, the diameter of the temperature sensitive component 2008 is less than inner diameter of the valve body 2001. The temperature sensitive component 2008 can also comprise one or more valve cavities 2183 that allow passage of fluid therethrough, when disposed in fluid communication with the fluid source 2402.

Figure 20:
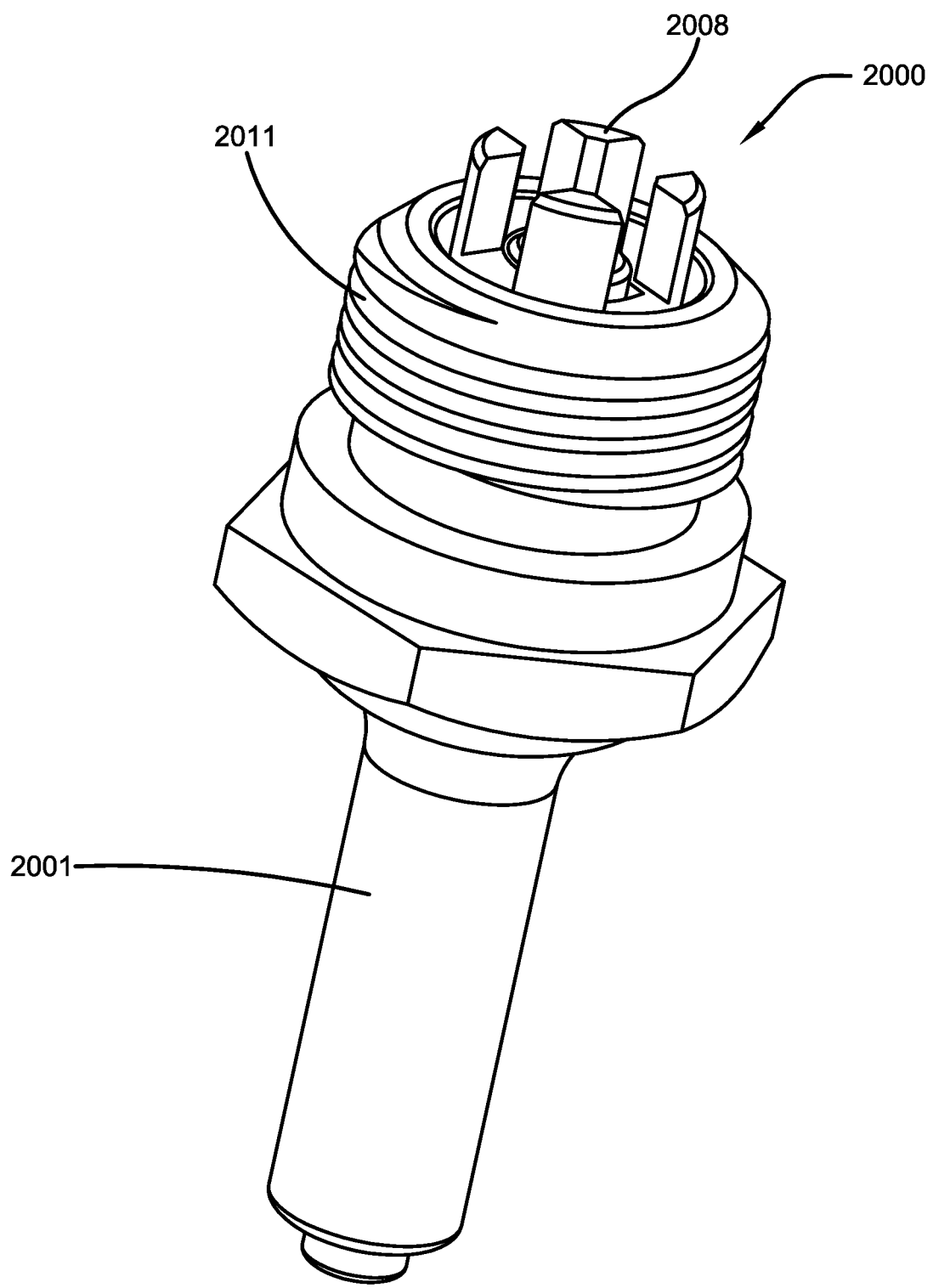
FIG. 20 is a component diagram illustrating an alternate implementation of an example intake valve where one or more portions of one or more systems described herein may be utilized.
Figure 24:
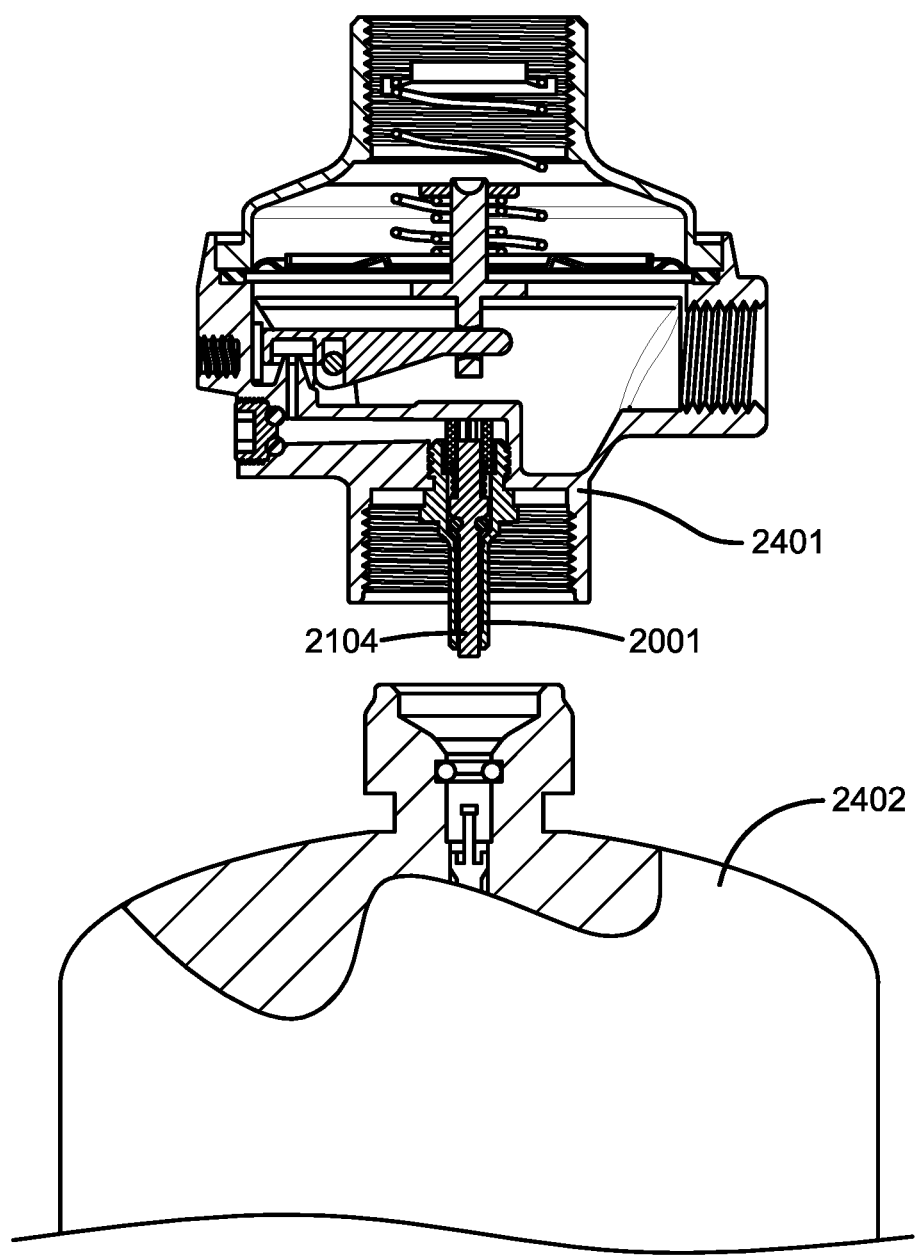
FIG. 24 is a component diagram illustrating an example implementation of one or more systems described herein.

As illustrated in FIGS. 20 and 21, the outer wall of the valve body 20011 can comprise a coupling component 2011, comprising screw thread 11, for example, which can allow for convenient installation, such as in a regulator 2401. As shown in FIG. 24, in one implementation, the valve body 2001 can be installed in a pressurized fluid intake valve 2401 (e.g., regulator). Further, the displacement member 2104 can be operably connected to an outlet valve disposed in the fluid source 2402. As an example, the fluid source 2402 can comprise a poppet valve that is displaced in an open position when contacted by the displacement member 2104. Additionally, the displacement member can be slidable displaced toward the proximal end of the example, valve 2000, against the biasing force of the biasing member 2307. In this way, for example, pressurized fluid from the fluid source 2402 can flow through the intake passage, 2102, into the valve chamber 2103, and out to the regulator 2401 through the fluid gap 2182.

However, as an example, if the connection between the regulator 2401 and the fluid source 2402 is not completely sealed (e.g., due to cross-threading), flammable fluid may escape around the connection. In this case, for example, the leaking fluid may ignite, causing combustion around the connection. The temperature sensitive component 2008 is configured to deform under elevated temperatures (e.g., greater than 100 degrees Celsius). For example, if the temperature sensitive component 2008 deforms, the biasing component may no longer be able to provide the biasing force needed to allow the displacement member to keep the poppet valve open in the fluid source 2402. In this way, for example, fluid from the fluid source 2402 may be shut off, thereby mitigating the combustion outside of the connection.

In one implementation, in order achieve a desired temperature deformation effect for the sacrificial component (e.g., 2008), the component can be comprised of a substance has the property of deformation and melting begins when the temperature reaches the desired deformation point (e.g., higher than 100 C). As an example, the low melting point material can be polyethylene (e.g., HDPE, LDPE, LLDPE), polypropylene (such as PP, MPP, MCPP), polyamide (e.g., nylon 6, nylon 66, nylon 11, nylon 12, nylon 1010, nylon 610, nylon 612, nylon 46. nylon 1212, aromatic nylon, copolymerized nylon, modified nylon and other nylon), polycarbonate (PC), polyoxymethylene (POM), polyphenylene ether (PPO/MPPO). thermoplastic polyester (such as PBT/PET/PCT/PTT/PEN/PBN), polytetrafluoroethylene (PTFE), polyvinylidene fluoride (PVDF), polyimide (PI), polyphenylene sulfide (PPS), polysulfone plastic (e.g., PSF, PES, PAS) polyketone plastics (such as PEEK, PEK, PAEK, PEKK, PESK, PEEKK, PEKEKK), polyarylate (PAR), polyvinyl chloride (PVC), polystyrene (PS), acrylonitrile-butadiene-styrene copolymer (ABS), or combinations of two or more of these substances.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method if manufacturing a device for mitigating fluid flow at a predetermined temperature, comprising:
    forming a valve body with a distal end and a proximal end, wherein the distal end operably engages with fluid supply, and the proximal end operably engages with a fluid intake, the valve body comprising an internal passage that fluidly couples the distal end with the proximal end;
    disposing a displacement member inside an internal passage of a valve body, wherein the valve body has a distal end and a proximal end,
        wherein the distal end operably engages with a fluid supply, and the proximal end operably engages with a fluid intake, and the valve body comprises the internal passage that fluidly couples the distal end with the proximal end, and
        wherein the displacement member comprises an elongate body with a proximal portion, and comprises a distal portion that operably engages with a fuel supply valve in a preset position that allows fluid to flow from the fuel supply into the internal passage; and
    selectably engaging a retention cap with the valve body at the proximal end, wherein the retention cap is comprised of a material that deforms under force at a predetermined temperature, operably resulting in the displacement member releasing the displacement member from the preset positon at the predetermined temperature, thereby closing the fuel supply valve.

2. The method of claim 1, wherein the displacement member comprising a proximal stop at the proximal end.

3. The method of claim 2, further comprising disposing a biasing component between and in contact with the retention cap and proximal stop, wherein the biasing component comprises a spring to operably apply a biasing force to the proximal stop of the displacement member sufficient to dispose the displacement component in the preset position.

4. The device of claim 3, the retention cap formed such that the deformation of the retention cap results in sufficient reduction of the biasing force to release the displacement member from the preset position.

5. The device of claim 3, disposing the biasing component in contact with a recessed shoulder in the retention cap.

6. The device of claim 1, the predetermined temperature representing a temperature substantially equivalent to a temperature reached during combustion of fluid leaking proximate the valve body.

7. The device of claim 1, disposing the displacement member inside the valve body such that the distal portion of the displacement member extends out of the valve body at the distal end to operably engage the fuel supply valve.

8. The device of claim 1, the retention cap so dimensioned to receive the proximal end of the displacement member.

9. The device of claim 1, comprising disposing a gasket on the displacement member that provides a seal in the internal passage between the proximal end and distal end of the valve body.

10. A method of using a temperature-sensitive valve, comprising:
   coupling a fluid intake device that operably receives flammable fluid with a fluid source, wherein the fluid intake device comprises a temperature sensitive valve;
   wherein the temperature sensitive valve comprises:
      a valve body comprising an internal passage having a proximal end and a distal end;
      an elongate valve displacement member disposed in the internal passage;
      a biasing spring providing a biasing force to bias the valve displacement member toward the distal end, the spring engaged with a spring seat at the proximal end, the spring seat comprising a material that deforms at a predetermined temperature to release the biasing force from the displacement member; and,
      wherein the displacement member is engaged with a fluid outlet valve of the fluid source to release fluid from the fluid outlet valve.

11. The method of claim 10, wherein the displacement member of the temperature sensitive valve extends outside the valve body, and the displacement member translated toward the proximal end upon deformation of the spring seat.

12. The method of claim 10, the valve body comprising external threading at the proximal end in threaded engagement with the fluid intake device.

13. The method of claim 10, upon coupling, the biasing force provided by the biasing component overcoming a closing force of a fluid outlet valve disposed in the fuel supply, thereby allowing for the release of fluid from the fluid outlet valve.

14. The method of claim 10, the valve body comprising a shoulder in the internal passage toward the proximal end, and the displacement member comprising a shoulder toward the distal end that engages the valve body shoulder when subjected to the biasing force.

15. The method of claim 14, the fluid intake device comprising a pressure regulator to regulate fluid pressure from the fluid source.

16. The method of claim 10, the spring seat comprising one of: a polymer, a eutectic alloy, and a linear low density polyethylene.

17. A method of making a fuel intake valve for use in a pressurized fuel connection, comprising:
   a valve body comprising an internal passage, a proximal end, and a distal end;
   disposing a displacement member inside an internal passage of a valve body that has a proximal end and a distal end;
   disposing a sacrificial member at least partially in the internal passage at the proximal end of the valve body, the sacrificial member comprising an annular body and a plurality of projections disposed around the perimeter of the sacrificial member to allow fluid flow out from the proximal end of the internal passage, and wherein the sacrificial member is comprised of a material that deforms under pressure at a predetermined temperature;
   disposing a biasing component between the sacrificial member and the displacement member to operably provide a biasing force to the displacement member toward the distal end of the valve body.

18. The method of claim 17, wherein the displacement member is disposed such that it extends outside the valve body.

19. The method of claim 17, comprising a fluid flow gap between the sacrificial component and an interior wall of the valve body.

20. The method of claim 17, disposing a retention cap at the proximal end of the valve body, wherein the sacrificial member comprises a collar disposed between the retention cap and the biasing component in the internal passage.

* * * * *